US012033020B2

(12) United States Patent
Cash et al.

(10) Patent No.: US 12,033,020 B2
(45) Date of Patent: Jul. 9, 2024

(54) WIRELESS INDOOR CONSUMER TRACKING

(71) Applicant: ABL IP HOLDING LLC, Conyers, GA (US)

(72) Inventors: Audwin Cash, Brookhave, GA (US); Mitri J. Abou-Rizk, Newton, MA (US); Sajin George, Somerville, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 229 days.

(21) Appl. No.: 17/146,669

(22) Filed: Jan. 12, 2021

(65) Prior Publication Data

US 2022/0222452 A1    Jul. 14, 2022

(51) Int. Cl.
*G06K 7/10* (2006.01)
*G06K 19/077* (2006.01)
(Continued)

(52) U.S. Cl.
CPC ... *G06K 7/10099* (2013.01); *G06K 19/07758* (2013.01); *G06Q 30/0226* (2013.01);
(Continued)

(58) Field of Classification Search
CPC ......... G06K 7/10099; G06K 19/07758; G06Q 30/0226; H04W 4/023; H04W 4/33; H04W 4/35; H04W 4/029; H04W 4/80
See application file for complete search history.

(56) References Cited

U.S. PATENT DOCUMENTS

2008/0068131 A1* 3/2008 Cargonja ............. G06K 7/0008
340/10.2
2008/0231432 A1* 9/2008 Stawar ................... B62B 3/142
340/8.1
(Continued)

OTHER PUBLICATIONS

Ivan-Damir Anic et al., "Relative effects of store traffic and customer traffic flow on shopper spending," The International Review of Retail, Distribution and Consumer Research, vol. 20, No. 2, May 2010, pp. 237-250.
(Continued)

*Primary Examiner* — James J Yang
(74) *Attorney, Agent, or Firm* — Buchanan Ingersoll & Rooney PC

(57) ABSTRACT

In an example, a method comprises communicating with a radio frequency (RF)-enabled asset tag within a space, tracking a location of the RF-enabled asset tag within the space, determining location estimates of the asset tag as the asset tag moves within the space, and accepting identifying information from or about a selected user. The method additionally comprises determining, based on a predetermined correspondence criteria, a correspondence between the asset tag location and a position estimate of an electronic hardware device within the space. Further, in response to determining the correspondence between the asset tag and the electronic hardware device and based at least in part on the identifying information accepted via the electronic hardware device, the method includes associating tracked asset tag location information corresponding to the location estimates of the asset tag as the asset tag moved within the space to identification of the selected user.

18 Claims, 9 Drawing Sheets

(51) Int. Cl.
G06Q 30/0226 (2023.01)
H04W 4/02 (2018.01)
H04W 4/33 (2018.01)
H04W 4/35 (2018.01)

(52) U.S. Cl.
CPC ............. H04W 4/023 (2013.01); H04W 4/33 (2018.02); H04W 4/35 (2018.02)

(56) References Cited

U.S. PATENT DOCUMENTS

| | | | | |
|---|---|---|---|---|
| 2017/0169440 | A1* | 6/2017 | Dey | H04W 4/021 |
| 2017/0257748 | A1* | 9/2017 | Takata | H04W 4/50 |
| 2018/0260877 | A1* | 9/2018 | Li | G06Q 20/322 |
| 2019/0212155 | A1* | 7/2019 | Gordon | G01C 21/3415 |

OTHER PUBLICATIONS

Thornsten Blecker et al., "Prospects for PoS Market Research with RFID Technology: Examination of Consumers' In-Store Shopping Processes," European Retail Research, vol. 25, Issue 1, 2011, pp. 47-62.

Mohamed Bourimi et al., "A Privacy-Respecting Indoor Localization Approach for Identifying Shopper Paths by Using End-Users Mobile Devices," Eighth International Conference on Information Technology: New Generations, 2011 (6 pages).

Shun Yin Lam, "The Effects of Store Environment on Shopping Behaviors: a Critical Review," in NA—Advances in Consumer Research, vol. 28 (2001) eds. Mary C. Gilly and Joan Meyers-Levy, Valdosta, GA: Association for Consumer Research, pp. 190-197, downloaded from https://www.acrwebsite.org/volumes/8468/volumes/v28/NA-28 on Feb. 26, 2011 (14 pages).

Jeffrey S. Larson et al., "An Exploratory Look at Supermarket Shopping Paths," International Journal of Research in Marketing, 22 (4), Apr. 2005, pp. 395-414 (45 pages).

Sandra S. Liu et al. "The Effects of Store Layout on Consumer Buying Behavioral Parameters with Visual Technology," Journal of Shopping Center Research (2007), vol. 14, No. 2, pp. 63-72.

Peilin Phua et al., "Validating Bluetooth Logging as Metric for Shopper Behaviour Studies," Journal of Retailing and Consumer Services, vol. 22 (2015), pp. 158-163 (https://www.sciencedirect.com/science/article/pii/S0969698914001490), Copyright © 2014 Elsevier Ltd. All rights reserved, 6 pages.

Point of Purchase Advertising International (POPAI), 2014 Mass Merchant Shopper Engagement Study: Executive Summary Report, An official POPAI publication, Chicago, IL (https://memberconnect.shopassociation.org/viewdocument/popai-2014-mass-merchant-shopper-en), 24 pages.

Paco Underhill, "Why We Buy: The Science of Shopping," Simon & Schuster Paperbacks, trade paperback edition Jan. 2009, Copyright ©, New York, NY, 1999, 2000, 2009 by Obat, Inc., 310 pages.

Kai Wang et al., Abstract: "The effects of forced ad exposure on the Web," Journal of Informatics & Electronics 3 (2008), 27-38, (https://www.researchgate.net/publication/228925987_The_effects_of_forced_ad_exposure_on_the_Web), 1 page.

Varpu Uotila et al., Abstract: "Space management in a DIY store analysing consumer shopping paths with data-tracking devices," Facilities 25 (9/10):363-374, (https://www.researchgate.net/publication/235291625_Space_management_in_a_DIY_store_analysing_consumer_shopping_paths_with_data-tracking_devices), 1 page.

Canadian Office Action for Canadian Application No. 3,144,830, dated Feb. 16, 2023, 9 pages.

Office Action issued Dec. 6, 2023, by the Canadian Intellectual Property Office in corresponding Canadian Patent Application No. 3,144,830. (9 pages).

* cited by examiner

FIG. 8

| Location Estimates 361-366, 861-870 Record # | 623 System | Asset Tag Identifier 682 251A-D Cart | Date/Time Coordinate 369x | Location Coordinates 367x | | 193x Selected User |
|---|---|---|---|---|---|---|
| | | | | X | Y | |
| 1 | RFID | A | 2020 04 01 09:00:00 | 10 | 7 | |
| 2 | RFID | B | 2020 04 01 09:00:02 | 12 | 7.5 | b |
| 3 | RFID | C | 2020 04 01 09:00:04 | 15.4 | 6.1 | c |
| 4 | RFID | D | 2020 04 01 09:00:06 | 2 | 9 | u10625 |
| 5 | RFID | A | 2020 04 01 09:01:00 | 10.5 | 7 | a |
| 6 | RFID | B | 2020 04 01 09:01:02 | 14 | 7.5 | b |
| 7 | RFID | C | 2020 04 01 09:01:04 | 14.8 | 6 | c |
| 8 | RFID | D | 2020 04 01 09:01:06 | 2 | 8.2 | u10625 |
| 9 | RFID | A | 2020 04 01 09:02:00 | 11 | 7 | a |
| 10 | RFID | B | 2020 04 01 09:02:02 | 16 | 7.5 | b |
| 11 | RFID | C | 2020 04 01 09:02:04 | 14.2 | 5.9 | c |
| 12 | RFID | D | 2020 04 01 09:02:06 | 2 | 7.4 | |
| 13 | RFID | A | 2020 04 01 09:03:00 | 11.5 | 7 | a |
| 14 | RFID | B | 2020 04 01 09:03:02 | 18 | 7.5 | b |
| 15 | RFID | C | 2020 04 01 09:03:04 | 13.6 | 5.8 | c |
| 16 | RFID | D | 2020 04 01 09:03:06 | 10 | 6 | d |

WIRELESS INDOOR CONSUMER TRACKING

TECHNICAL FIELD

The present subject matter relates to systems and methods to associate a tracked asset tag with a user, based on a physical correspondence between the tracked asset tag and a device the user is operating.

BACKGROUND

Online marketplaces have significantly increased the amount of data online retailers are able to collect about their customers' shopping habits, at an almost incidental level of cost: every single page view, every click shoppers make can be saved, analyzed, and applied to improve website performance and drive growth. This has put brick and mortar stores at a competitive disadvantage: high-quality consumer tracking in physical stores has been confined to research projects set in particular stores using specialized data-gathering setups. Therefore, detailed consumer behavior data, such as consumer movement data, has not been available to most store operators. Updating such data has required the conduct of dedicated studies, and movement data has not been linked extensively to consumer-specific, out-of-store data.

New technology has allowed for tracking electronic radios, like radio frequency (RF) tags through a store: the tag is usually attached to a product, or is somehow attached to the consumer. This tag can be tracked by sensors, and a graph of positional data over time can be generated. However, tagging every item in the store can be dauntingly expensive, and tagging consumers (usually via their personal smartphone) requires several authentication steps, development to ensure hardware compatibility, and sensors that can accurately track the plethora of mobile devices on the market.

A closed radio system, where the tracked RF tag is owned and controlled by the same entity as the in-store sensors, would produce more reliable and cost-effective tracking data. The problem in having an entirely closed ecosystem for tracking; however, is associating the tracking data with a consumer. In a closed ecosystem where a shopping cart is tracked via an attached RF tag, an RF tracking system may see that the tagged shopping cart entered the store, travelled down aisles three, seven, and twelve, before passing through the checkout area and out of the store. This cart tracking data however does not show who was moving the shopping cart. To mimic the ability to capture customer behavior found online, in-store trackers need to track particular consumers, over multiple visits. Tracking specific consumer movement data aids in learning what store designs improve or inhibit the shopping habits of certain types of consumers. To meaningfully use consumer data, the movement of a consumer needs to be associated with that consumer, across multiple visits.

SUMMARY

Hence, there is still a need for further improvement in technologies for associating a tracked asset tag in a space, and the corresponding movement data, with a user. Associating movement data with a user entails associating an electronic device with a user, and then associating that electronic device with an asset tag and its relevant movement history.

In an example, a system comprises one or more radio frequency-enabled nodes located within a space, each radio frequency-enabled nodes being configured to communicate with a radio frequency (RF)-enabled asset tag within the space. The RF-enabled asset tag is coupled to an asset movable within the space. A radio frequency-enabled asset tag location estimation system is configured to track location of the RF-enabled asset tag within the space and determine location estimates of the RF-enabled asset tag as the RF-enabled asset tag moves within the space responsive to communications between the one or more radio frequency-enabled nodes and the RF-enabled asset tag. An electronic hardware device is configured to accept identifying information from or about a selected user. A back end server is coupled to the radio frequency-enabled asset tag location estimation system. The back end server configured to receive asset tag location information from the asset tag location estimation system corresponding to the location estimates of the RF-enabled asset tag as the RF-enabled asset tag moves within the space. Additionally, the back end server is configured to determine, based on a predetermined correspondence criteria, a correspondence between the RF-enabled asset tag location and location of the electronic hardware device within the space. Further, in response to determining the correspondence between the RF-enabled asset tag and the electronic hardware device and based at least in part on the identifying information accepted via the electronic hardware device, the back end server is configured to associate the received asset tag location information corresponding to the location estimates of the RF-enabled asset tag as the RF-enabled asset tag moved within the space to identification of the selected user in a database.

In another example, a method comprises communicating with a radio frequency (RF)-enabled asset tag within a space, tracking a location of the RF-enabled asset tag within the space, determining location estimates of the RF-enabled asset tag as the RF-enabled asset tag moves within the space, and accepting identifying information from or about a selected user. The method additionally comprises determining, based on a predetermined correspondence criteria, a correspondence between the RF-enabled asset tag location and location of an electronic hardware device within the space. Further, in response to determining the correspondence between the RF-enabled asset tag and the electronic hardware device and based at least in part on the identifying information accepted via the electronic hardware device, the method includes associating the received asset tag location information corresponding to the location estimates of the RF-enabled asset tag as the RF-enabled asset tag moved within the space to identification of the selected user.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

FIG. 8 illustrates an example of database entries that combine data inputs obtained from an asset tag location estimate system used to monitor the location of and movement of inventory assets and data from a user identification system used to identify selected users.

DETAILED DESCRIPTION OF THE DRAWINGS

Figure 1:
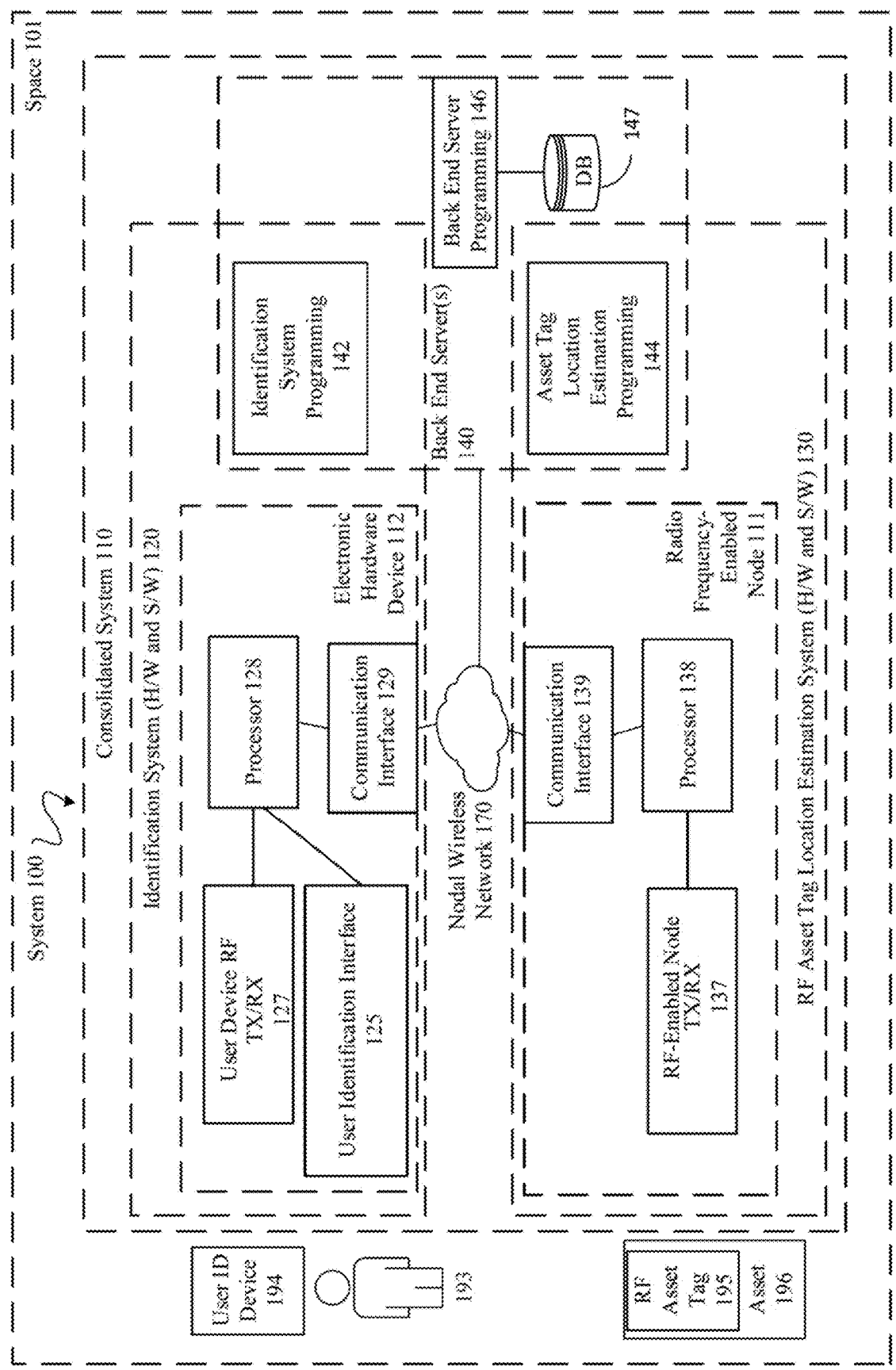
FIG. 1 is a functional block diagram of an example of an overall system for coordinating information from tracking of an asset tag and information for identifying a user.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In the examples, herein, the light fixture nodes are just one example of a radio frequency (RF)-enabled node 111 with known location coordinates, which includes additional components; however, the locating of RF asset tags 195 can be applied to various other types of RF-enabled nodes 111. Generally, the RF-enabled node 111 includes a minimum subset of components of the light fixture node shown in FIG. 54 such as the wireless transceiver circuitry 450, memory 442 (including the depicted node programming 445 and data), CPU 443, and power supply 405. However, the RF-enabled node 111 does not have to include the light source 420, driver circuit 410, drive/sense circuitry, and detector(s) components. An RF asset tag 195 is an example of an RF identification tag that is a chip with a radio that emits a signal with a certain signal strength, small packets of information, and has an asset tag identifier. RF-enabled nodes 111 can be connected together via wired and/or wireless networks.

The examples in the drawings and described below relate to locating at least one or more RF asset tags 195 using a previously commissioned wireless RF asset tag location estimation system 130. During commissioning, a virtual map of a physical installation of RF-enabled nodes 111 (e.g., light fixture nodes) within an indoor space of a room, building, etc. or an outdoor space (e.g., streetlights) is created.

Although the discussion herein is focused on light fixture type luminaires that have a fixed position in a space, it should be understood that other types of luminaires can be used/sensed in lieu of light fixtures, such as lamps, particularly if the lamps have a fixed position in the space. The term "luminaire" as used herein, is intended to encompass essentially any type of device, e.g., a light fixture or a lamp, that processes energy to generate or supply artificial light, for example, for general illumination of a space intended for use of or occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaries in or on a particular premises have other lighting purposes, such as signage for an entrance or to indicate an exit. In most examples, the luminaire(s) illuminate a space of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below.

The "luminaire" can include other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). As noted, the lighting component(s) are located into an integral unit, such as a light fixture or lamp implementation of the luminaire. The electronics for driving and/or controlling the lighting component(s) may be incorporated within the luminaire or located separately and coupled by appropriate means to the light source component(s).

The term "RF asset tag location estimation system" or "lighting system," as used herein, is intended to encompass essentially any type of system that either includes a number of such luminaires coupled together for data communication and/or luminaire(s) coupled together for data communication with one or more control devices, such as wall switches, control panels, remote controls, central lighting or building control systems, servers, etc.

The illumination light output of a luminaire, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any luminaire, however, may be controlled in response to commands received with the network technology of the lighting system, e.g. to turn the source ON/OFF, to dim the light intensity of the output, to adjust or tune color of the light output (for a luminaire having a variable color source), etc.

Terms such as "artificial lighting," as used herein, are intended to encompass essentially any type of lighting in which a luminaire produces light by processing of electrical power to generate the light. A luminaire for artificial lighting, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type.

Illumination light output from the light source of the luminaire may carry information, such as a code (e.g. to identify the luminaire or its location) or downstream transmission of communication signaling and/or user data. The light based data transmission may involve modulation or otherwise adjusting parameters (e.g. intensity, color characteristic or distribution) of the illumination light output of the light source of the light source of the luminaire.

Terms such as "lighting device" or "lighting apparatus," as used herein, are intended to encompass essentially any combination of an example of a luminaire discussed herein with other elements such as electronics and/or support structure, to operate and/or install the particular luminaire implementation. Such electronics hardware, for example, may include some or all of the appropriate driver(s) for the illumination light source, any associated control processor or alternative higher level control circuitry, and/or data communication interface(s). The electronics for driving and/or controlling the lighting component(s) may be incorporated within the luminaire or located separately and coupled by appropriate means to the light source component(s).

The RF-enabled nodes may be nodes for wireless communication only. In many deployments, however, at least some of the RF-enabled nodes have additional hardware for other purposes. For example, some nodes may include sensors, some nodes may include components to monitor or control equipment (e.g. equipment of a heating, ventilation and air conditioning system, access control system, surveillance and alarm system, or the like). For illustration and discussion purposes, some or all of the RF-enabled nodes in the specific examples have additional hardware for lighting related purposes. Most such nodes may take the form of light fixtures or other types of luminaires that include light sources and associated driver circuitry, although some lighting system type nodes may include lighting related sensors (e.g. occupancy sensors and/or ambient light sensors), whereas other lighting system type nodes may include user interface hardware (e.g. to serve as wall-switches or wall controllers for user control of the luminaire nodes).

Software broadly encompasses executable program instructions and associated data if any that a programmable processor-based device utilizes to implement functions defined by the software. Various combinations of programming instructions and associated data fall under the broad scope of software. Firmware is a category of software. Although firmware may provide an operating environment for complex higher layer application programs; for a lower processing capacity device, such as a wireless enabled node for a controlled system (e.g. fixture or other device in a lighting system), the firmware provides all the programming for the data processing and operational control of device hardware to implement the wireless communications and any other functions of the particular device.

The space where the system is operating, can include a variety of manmade structures or natural spaces modified by direct or indirect human efforts. The space conventionally may be a retail space, but it could also be, for example, an office space, a warehouse, or a hangar. It could also be an outdoor space with node installations, such as a parking lot, or a roadway. The space could also be a mixed use area, such as a transportation hub with both indoor and outdoor radio frequency-enabled nodes, or an airport. A building space is a space that is partially or completely occupied by a structure.

The term "lighting system element" can include other elements such as electronics and/or support structure, to operate and/or install the particular node implementation. Such electronics hardware, for example, may include some or all of the appropriate driver(s) for any coupled illumination light source, any associated control processor or alternative higher level control circuitry, and/or data communication interface(s). As noted, the lighting component(s) are located into an integral unit, such as a light fixture or lamp implementation of the detector. The electronics for driving and/or controlling the lighting component(s) may be incorporated within the detector node or located separately and coupled by appropriate means to the light source component (s).

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Light output from the fixture or other type of luminaire may carry information, such as a code (e.g. to identify the luminaire or its location) or downstream transmission of communication signaling and/or user data. The light based data transmission may involve modulating or otherwise adjusting parameters (e.g. intensity, color characteristic or distribution) of the illumination light output from the device.

The term "node" may refer to an RF-enabled communication device that may provide communication services, e.g. for identification services, building control system management services and the like. A node may be a connection point in a network that can receive, create, store and/or send data via communication links within the network. Each node is configurable to transmit, receive, recognize, process and originate and/or forward transmissions to other nodes, other devices operating as an access point to a network, or outside the network. The communication services provided by a node may enable networked and non-networked devices, such as asset tags, to send data to a node and receive data from the node. Each node may also be referred to as a "beacon."

A "location estimation" system is a system that provides position estimation services and in some cases additional position or location based services over any relatively limited area. The area so served may be partly or entirely confined within a building, ship, mine, or other enclosed structure, but is not necessarily so confined. Hence, a "location estimation system" may operate partly or wholly in unenclosed spaces, e.g., over a campus, pedestrian mall, fairground, or the like, where such a service area may also include the interiors of one or more enclosures. Moreover, the spaces or areas served by a single system may not all be contiguous (e.g., the system may distinguish between a number of spaces at somewhat separate locations and support navigation between as well as within those spaces).

An "asset tag location estimation" system is a system configured to provide location estimation services that discover and utilize information about asset tag locations in flat "areas" over which a two-dimensional coordinate system is appropriate (e.g., the floor space of a store or warehouse), the technologies discussed below are also applicable to systems discovering and utilizing information about asset tag locations in three-dimensional spaces. Collection of location estimates for a tag associated with a particular asset over time may allow the system to track the position of the asset within the areas, for example, if the asset is moved within an area.

Although described as two systems, some or all of the components of the identification system and the asset tag location estimation system may be used in common to provide similar functions for both asset tracking and position estimations relative to a user's mobile device, in the context of an overall estimation system for RF asset tag location and mobile device position estimations.

In the following examples, an "asset tag" may be a movable RF-enabled device, associated with a specific object, capable of (1) receiving radio signals from network nodes, and (2) broadcasting information to the node network for relay to a back end server. A tag may also have additional capabilities as may be described with reference to the following examples.

Reference now is made in detail to the examples illustrated in the accompanying drawings and discussed below. FIG. 1 is a functional block diagram of an example of a system 100 for coordinating information from tracking of an asset tag and information from estimating positions of a user device 194 (e.g., mobile device) over time. The system 100 includes a consolidated system 110, an RF asset tag 195, a selected user 193, and may include the user ID device 194. The consolidated system 110, also referred to as an RF asset tag location estimation and identification system, includes an identification system 120, a radio frequency (RF)-enabled asset tag location estimation system 130, and one or more back end servers 140 that implement a back end server programming 146.

The RF asset tag location estimation system 130 may be configured to track a location of a radio frequency (RF)-enabled asset tag 195, such as within a space 101. The RF-enabled asset tag 195 may be coupled to an asset 196 within the space. This example of an RF asset tag location estimation system 130 includes one or more radio frequency-enabled nodes 111. These radio frequency-enabled nodes 111 each include a processor 138 and an RF transmitter (TX)/receiver (RX) 137. Details of the radio frequency-enabled nodes 111 and communications with the asset tag 195 are explained with reference to other examples.

The identification system 120 may be configured to determine a location of the user device (e.g., mobile device) 194 within the space 101, for example, by tracking the mobile device 194 the user 193 is carrying. Alternatively, the location of the user 193 may be determined using a camera based system or a radar based system. Additionally, the position of the user identification interface 125, such as point-of-sale (POS) terminal, may be known, and the system may associate the user 193 with the location of the user identification interface 125 when the user 193 interacts with the user identification interface 125. The identification system 120 is an RF-based communication system configured to exchange RF signals with the user device 194 and determine the location of the user device 194 based on the exchanged RF signals. Alternatively or additionally, the identification system 120 includes a user identification interface 125, such as a POS terminal, that is configured to take identifying information from the user 193, thereby determining the location of the user by knowing the location of the user identification interface 125. Details of the identification system user identification interface 125 and communications with the user device 194 are explained with reference to other examples.

In some examples, particularly where the user is identified by their mobile device 194, the RF transmitter (TX)/receiver (RX) of the identification system 120 can be used by the location estimation system 130. In such an example, it is possible for all of the analogous components (RF TX/RXs 127, 137; processors 128, 138; communication interfaces 129; 139) to be co-located, and one set of components can serve the purposes of both the identification system 120 as well as the location estimation system 130.

The back end server(s) 140 implementing back end server programming 146 may be coupled via a nodal wireless network 170 and respective communication interfaces 139 and 129 to the RF-enabled nodes 111x and the user identification interface 125. Nodal wireless network 170 between the asset tag 195, RF-enabled nodes 111x, user device 194, electronic hardware device 112 may include a wireless network, such as Bluetooth, Zigbee, etc. In some examples, however, the nodal wireless network 170 to the back end server 140, e.g., for communication with the electronic hardware device 112 may be a wired or wireless local area network (LAN) or a wired wide area network (WAN). The back end server programming 146 may be configured to receive asset tag 195 location information from the RF asset tag location estimation system 130 corresponding to an RF-enabled asset tag 195 within the space via the communication interface 139 and nodal wireless network 170.

While the identification system 120 and the asset tag location estimation system 130 are at times described separately, the identification system 120 and the asset tag location estimation system 130 may cooperate to function together as part of the consolidated system 110, such a cooperative system may also be referred to as a radio frequency (RF) asset tag location and selected user identification system. As part of the consolidated system 110, the respective systems 120 and 130 may share hardware and/or software resources as described with reference to the following examples.

Other details of the respective elements of FIG. 1 may be described in more detail with respect to other examples. For example, the example RF asset tag 195 of FIG. 1 may be described in more detail with reference to the asset tag example of FIG. 2.

Figure 2:
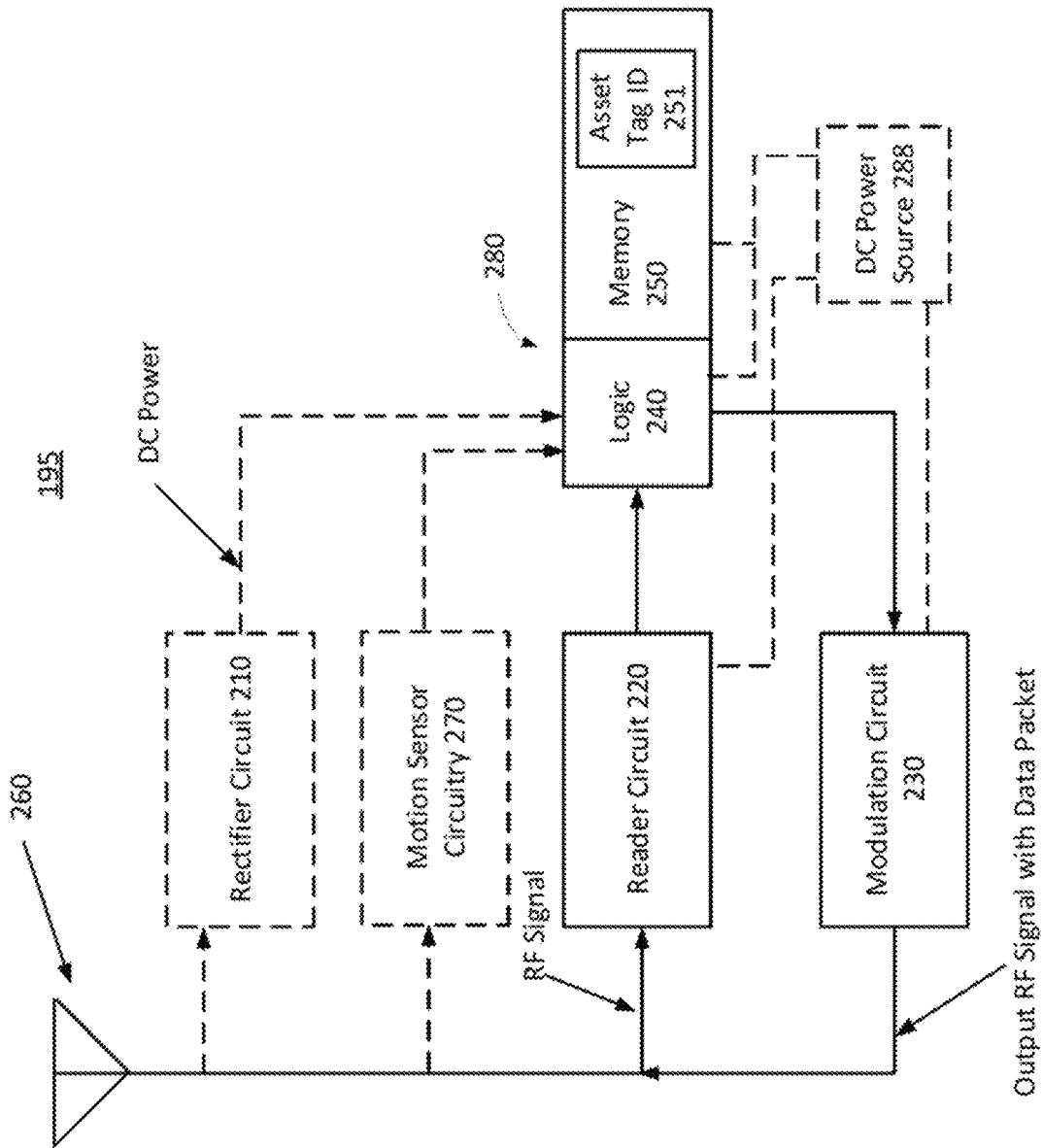
FIG. 2 illustrates a functional block diagram of an example of an asset tag.

FIG. 2 is a functional block diagram of an example of an asset tag 195 usable with the examples described herein. Depending upon whether the asset tag 195 is an active tag or a passive tag, the asset tag 195 may have different types of components related to how the asset tag 195 is powered. For example, in the case in which the asset tag 195 is an active tag, the power source 288 may be a dedicated source of power, such as a battery, a solar cell, or the like. Conversely, if the asset tag 195 is a passive tag, the asset tag will obtain and/or convert energy from sources not dedicated to providing power the asset tag 195 for use to perform functions. For example, the passive tag may use the energy of a received signal to provide power via circuitry, such as rectifier circuit 210, to generate power either for immediately powering the logic circuitry 240 or for later use by storing the energy using capacitors or the like.

Radio frequency signal transmissions from one or more nodes as described in the following examples may be received by one or more tags 195. When configured as a passive tag, asset tag 195 includes an antenna 260, rectifier circuit 210 (e.g., a capacitor, diodes or the like) 210, reader circuit 220, an information processing circuitry 280, and a modulation circuit 230.

The asset tag antenna 260 is capable of both receiving radio frequency (RF) signals and of transmitting radio frequency signals. For example, the RF signals transmitted and received by the tag 204 may be radio-frequency identification (RFID), Bluetooth, Zigbee, or the like, that may be processed according to the appropriate communication protocols. While reference is made in the examples to RFID components and signals, the RF signals transmitted, received and processed in the examples are not intended to limited to RFID components and signals. When the asset tag antenna 260 receives RF signals some of the energy in the RF signals is converted by the rectifier circuit 210 into direct current (DC) power. In the case of a passive tag configuration to tag 195, if the received signal has sufficient signal strength, the converted DC power is sufficient to supply power to the other components of the tag 195.

For example, with sufficient DC power, the information processing circuitry 280 may be powered for some interval. The received signal is also input to the reader circuit 220 which may be configured to process the input signal and output data representative of the incoming message. The information processing circuitry 280 may include logic circuitry (or simply "logic") 240 and a memory 250. The memory 250 may store an asset tag ID 251, identifying the asset tag 195 to external electronic components, and other information related to the tag 195. The logic 240 of information processing circuitry 280 may be configured to perform functions that include the processing of signals received through the antenna 260 utilizing the logic circuitry 240 and transmitting information (e.g., a unique identifier of the node that transmitted the received signal) through the antenna 260.

The information processing circuitry 280 may be configured to measure a received signal strength (RSS) of a signal transmitted by a node. The measured RSS may have, or may be converted into, an RSS indicator (RSSI) value as will be described in more detail with reference to other examples. The RSS measurement capabilities of the logic 240 may be available to a passive tag implementation as well as an active tag implementation.

If more processing capabilities are needed, the tag 195 may be configured to receive DC power from a DC power source 288 in which case the tag 195 operates as an active tag. When implemented as an active tag, the tag 195 may include antenna 260, DC power source 288, reader circuit 220, information processing circuitry 280, and modulation circuitry 230. The active asset tag 195 receives sufficient power form the DC power source 288 to enable operation of the reader circuit 220, the modulation circuitry 230, the logic 240 and the memory 250.

The asset tag 195 is coupled to an asset 196, which may be any asset being tracked by an RFID system (not shown in this example), and a customer or a user may be any person being tracked by the PS (e.g. could be an associate). Generally, the asset tracked in this example is property owned by the space's owner that is not for sale to the conventional consumer: for example, a cart, basket, or dolly.

Therefore asset tag 195 is some form of device capable of RF communication with the RF-enabled nodes 111—either actively by broadcasting in a manner that the RF-enabled nodes 111 can receive via the local wireless network communication interface 113, or passively by receiving transmissions from the RF-enabled nodes 111. In the example of FIG. 2, RF-enabled nodes 111 communicate with the asset tag 195 and the back-end server 140 to determine a physical location of the asset tag 195 in the space 101. Generally, the RF asset tag location estimation system 130 determines an initial position in the space 105 of the asset tag 195 based on one or more received signal strength indicator (RSSI) data communication measurements (e.g., Bluetooth™ or WiFi) to at least one RF-enabled node.

In this example, the initial position of the asset tag 195 is based on one or more RSSI data communication measurements to two RF-enabled nodes 111. The farther the asset tag 195 is from the RF-enabled nodes 111, the lower the respective RSSI data measurement becomes. The set of location coordinates of the RF-enabled nodes 111 are all known, and therefore the RSSI measurements are triangulated and/or trilaterated to calculate the physical location of the RF asset tag 195 within the space 101 when three or more RF-enabled nodes are able to collect RSSI data measurements. However, trilateralization with RF-enabled nodes 111 to calculate that the physical position of the asset tag 195 is between two ambiguous points is still valuable for the purposes of locating that asset tag 195. Furthermore, even a case where only a single RF-enabled node 111 is able to collect RSSI data measurements of a given RF asset tag 195 is still valuable, as it confirms that the RF asset tag 195 is within a given radius.

This is one is just one possible use of a set of RF-enabled nodes 111. The RF-enabled nodes 111 could be streetlights in an outdoor space, which are dimmed on or off. In some examples, the RF-enabled nodes 111 are BLE wireless beacons or other wireless RF devices. For example, this asset tag-tracking technique could be used with wireless beacons that are not light fixture nodes, but rather more general RF positioning nodes. As another alternative, the asset tag-tracking technique can be used with RF-enabled nodes 111, but not in a positioning system, and instead where the physical location coordinates 127A-W of the RF-enabled nodes 111 is needed to set up zones for dimming of a lighting system.

Figure 3:
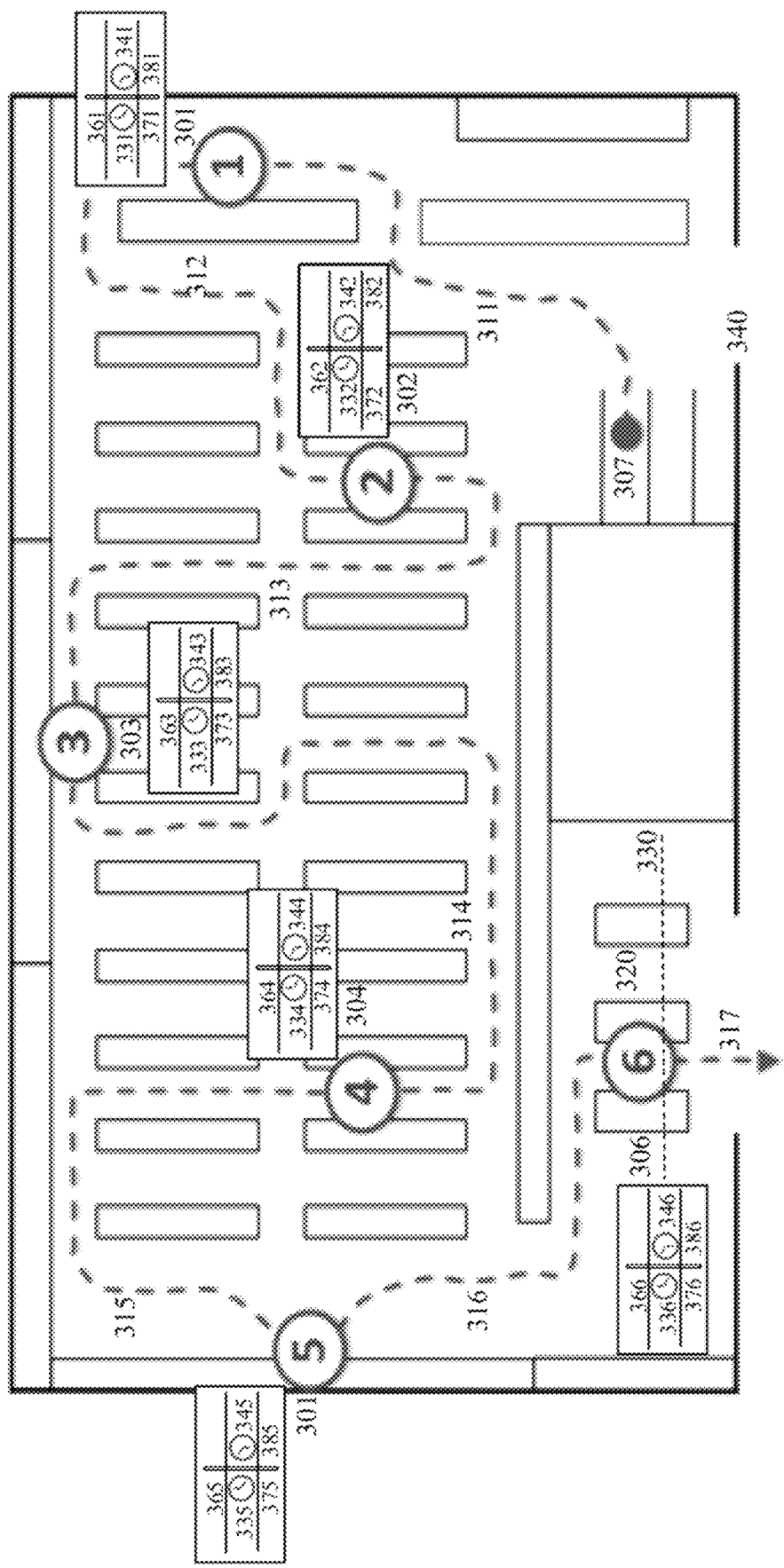
FIG. 3 depicts a plan of an indoor space illustrating an example of a tracked movement path of an asset tag through the space, as the tagged asset travels between aisles, stops at a terminal, and ultimately exits the space.

FIG. 3 is an overhead diagram of the path of a tagged asset 196 through a space 101. The space in this example is depicted as a supermarket, however any kind of space that can be traversed by the asset could be a valid example. The tagged asset 196 has an asset tag 195, and is a shopping cart in this example. At point 307 in the diagram, the asset is stored and is not in use. A user 193 enters the space through the entry door 340, and takes control of the shopping cart at point 307. The user then proceed to walk along path 311 to point 301, potentially examining the goods on sale in the supermarket. During this, the asset tag location estimation system 130 is tracking the position of the asset tag 195, and recording the tag's 195 position on a date and over time, within the space 101. The asset tag location estimation system 130 does this by capturing a plurality of asset tag location estimates 361-366, which correspond to the asset tag identifier (ID) 251 of the asset tag 195. Each asset tag location estimate 361-366 includes a respective two-dimensional location coordinate 367A-F of a respective point 301-306, as well as a respective date/time coordinate 369A-F, which can include a date and a time component, of the date and time at which the respective location coordinate 367A-F is captured, in this example near noon. In other examples the location coordinates 367A-F may include three-dimensional coordinates.

The user 193 moves with the shopping cart, and consequently the asset tag 195, through a sequence of points, including: point 301 to point 302, point 303, point 304, point 305, point 306, etc. At each of the points 301-306, respective asset tag location estimates 361-366 are captured, which include the respective location coordinates 367A-F at points 301-306 of capture, as well as the respective date/time coordinates 369A-F at which the respective location coordinate 367A-F is captured and the asset tag identifier 251 of the asset tag 195. The user 193 may spend more time at some points 301-306 than others, hence a respective time duration 368A-F can be determined by comparing the date/time coordinate 369B of one location estimate 362 to the prior date/time coordinate 361A of the prior location estimate 361: this information can be valuable to determine user's 193 focus within the space 101 (e.g., store), and can lead to improvements in where products are located, and in what products are stocked. Finally, the user 193 proceeds with their cart and asset tag 195 down path 316 (e.g., trajectory) to point 306, which is the point of sale terminal 320. This point of sale terminal 320 acts as a user identification interface.

Until now, the consolidated system 110 has only collected path information: the consolidated system 110 has to associate that information with a specific user 193 or their account. In this example, when the user 193 performs the checkout process, they are asked to identify themselves: for instance, by presenting a membership card or ID, or by using a credit card already associated with a specific consumer account. At or near the time the user 193 makes the association, perhaps by entering their user ID number into the point of sale terminal 320, the consolidated system locates the asset tag 195 in closest reasonable proximity to the terminal 320. Asset tag 195 has a location estimate 366 near the terminal 320. Because the user 193 is near the terminal 320, and the terminal 320 is near the asset tag 195, it is likely that the user 193 has been travelling with the asset tag 195 during their trip through the space 101. Therefore, with this association, the consolidated system 110 can now associate the user 193 with the travel path 311-316 made through the store by the asset tag 195.

On repeat trips, or on trips to other spaces with similar systems, the owner of the space can compare multiple store visits by the same user 193 and determine if, for example, changing the ordering of their shelves improves shopping speed. When the travel path 311-316 is combined with the sale data, stores can additionally see whether placing certain goods in certain places increases or decreases sales of particular goods. The travel path 311-316 can also be converted into a graph to aid in visualizing consumer travel through the space.

Once the user 193 has completed their transaction, the user 193 can continue to be tracked via the associated asset tag 195 until they leave the space 101, in this case via the exit door 330. The asset tag 195 is not prevented from leaving the space in this example, although once out of range of the radio frequency-enabled nodes 111 it can no longer report positional data to the consolidated system 110.

The asset tag 195 may signal its position to the radio frequency-enabled nodes 111 of the consolidated system 110, or it may track its 195 own position via RF signal sent by the radio frequency-enabled nodes 111, and report back to the consolidated system 110 the movements of the asset tag 195.

In other example, the selected user 193 has a personal user device 194, such as a smartphone. The user device 194 can also be tracked by the consolidated system 110, and as the selected user 193 moves through the space 101 (e.g. the store), position estimates 371-376 are captured, which include a respective user device identifier 377A-F, a respective location coordinates 378A-F, and a respective date/time coordinate 379A-F. Location coordinates 378A-F of the position estimates 371-376 and the location coordinates 367A-F of the location estimates 361-366 have very similar associated points 301-306. Date/time coordinates 379A-F of position estimates 371-386 and the date/time coordinates of location estimates 361-366 are also similar as a result of being taken from the asset tag 195 and the user device 194 that were in close proximity as the selected user 193 moved through the space 101 (e.g., store). If the selected user 193 came back hours later and walked the same route, additional position estimates 381-386 of the user device 194 would also be captured for the selected user 193: with similar location coordinates 378x corresponding to points 301-306 as coordinates, but at a different respective date/time coordinate 379x.

The back end server 140 may determine via an asset tag location estimation programming 144 locations of the RF-enabled asset tag 195 within the space based on the location information provided by the RF asset tag location estimation system 130. The asset tag location information includes the location estimates 361-366, which include both the location coordinates 378A-F of the points 301-306 of the RF-enabled asset tag 195, as well as the date/time coordinate 379A-F those location coordinates 378A-F were captured. The back end server 140 may determine via the identification system programming 142 position estimates 371-376 of the user device 194 within the space 101 based on the location information provided by the identification system 120. The user device 194 location information would be some or all of the position estimates 371-376: the more often the user device 194 and the RF-enabled asset tag 195 were near the same place at the same time increases the probability that the two correspond. In some examples, more weight might be given to the position estimate 376 near the point of sale terminal 320.

In examples where the user device 194 is not tracked, then when the selected user 193 interacts with the point of sale terminal 320 near location estimate 366, it is presumed the selected user 193 is at point 306, and so location estimate 366 has the only location coordinate 367F, and date/time coordinate 369F of the selected user 193 to correlate the asset tag 195 to the selected user 193. The back end server programming 146 may store in the database 147 the mobile device 194 location information in the form of position estimates 371-376 provided by identification system 120, the asset tag location information in the form of location estimates 361-366 provided by RF asset tag location estimation system 130, and the location estimate 366 captured when the user 193 interacted with the user identification interface 125.

This system can also apply to a setting where the space 101 is a warehouse, with similar improvements. Instead of a point of sale system 320, the user identification system could be a terminal near a truck loading bay: in that example, a user 193 moves through the space 101 with a dolly equipped with an asset tag 195, collecting goods for delivery to a departing truck. The user 193 identifies themselves in a similar manner as the customer in the supermarket example, and the owner of the system 100 now has data related to how quickly the space 101 can be traversed, or whether the items required by the user 193 are stored along an efficient path 311-316. In another example, the user 193 is not identified by their input to an identification terminal 125, but rather by their smart device 194.

The user 193 enters the space 101 (e.g. the store) and takes all of the same physical actions up until interacting with the identification terminal 320. However, the user 193 has a smart device 194 which has been authenticated with the identification system 120. This authentication may have been performed when the user 193 installed an application, or visited a website on their smart device 194. In this example, as the user moves from point 301 to 302, along path 312, the smart device 194 has had its position tracked by the identification system 120. The consolidated system 110 takes this path 312 tracked of the smart device 194, recorded as the difference between position estimate 375 and position estimate 376, and the path 312 tracked of the asset tag 195, recorded as the difference between location estimate 365 and location estimate 366. The consolidated system 110 compares these paths, and if it finds them substantially similar, it concludes that there is an association between the smart device 194 and the asset tag 195 along path 312. If the user 193 is associated with the smart device 194, and the smart device 194 is associated with the asset tag 195, and the asset tag 195 is associated with the shopping cart, then the user 193 is associated with the shopping cart. In this manner, the consolidated system 110 is able to draw a similar conclusion as it did in the example where the user 193 and the asset tag 195 are associated at the point of sale terminal 320.

The example involving the smart device 194 can involve using any number of path segments 311-316. Furthermore, this example is capable of disassociating a user 193 from a given asset tag 195 if the two tags stray too far apart for too long, if the user 193 leaves the space 101 without the asset tag 195, if the asset tag is returned to storage at point 307, or if the user 193 begins moving with a different asset tag, leaving the original asset tag 195 behind.

Therefore, FIG. 3 depicts a system 100, comprising one or more radio frequency-enabled nodes 111 located within a space 101. Each radio frequency-enabled node 111 communicates with a radio frequency (RF)-enabled asset tag 195 within the space 101. The RF-enabled asset tag 195 is coupled to an asset 196 movable within the space 101. The system further comprises a radio frequency-enabled asset tag location estimation system 130 that tracks the location of the RF-enabled asset tag 195 within the space 101 and determines location estimates 361-366 of the RF-enabled asset tag 195 as the RF-enabled asset tag 195 moves within the space 101 responsive to communications between the one or more radio frequency-enabled nodes 111 and the RF-enabled asset tag 195. The asset tag location estimation system 130 estimates the location of the RF-enabled asset tag 195 by using the radio frequency-enabled nodes 111 to continuously contact the RF-enabled asset tag 195. Alternatively, the asset tag location estimation system 130 estimates the location of the RF-enabled asset tag 195 by having the RF-enabled asset tag record 195 which radio frequency-enabled nodes 111 the RF-enabled asset tag 195 is able to communicate with.

The system 100 additionally comprises an electronic hardware device 112 (e.g. point of sale terminal 320) which accepts identifying information from or about a selected user 193. The electronic hardware device 112 is an installed stationary computing device, and the identification system 120 determines the location of the electronic hardware device 112 in the space at the time of installation. The identifying information can include a variety of identifiers, such as a customer number, a phone number, or a username. The identifying information can include unique values such as a randomly assigned loyalty account number, a non-unique value such as a birthdate, or a combination of inputs including one or more identifiers. The electronic hardware device 112 can accept the identifying input a multitude of ways: the selected user 193 can enter a customer number by using a keypad connected to the electronic hardware device 112, or scan a barcode on a loyalty card which encodes the loyalty account number, or use a thumbprint or iris scanner to enter biometric data into the electronic hardware device 112. Another person, such as an employee, technician, or a companion of the selected user 193 may act as an intermediary, and enter the selected user's 193 identifying information into the electronic hardware device 112.

In an alternative example, the electronic hardware device is a handheld computing device 194, such as a mobile device. In this example, the radio frequency-enabled asset tag location estimation system 130 exchanges RF signals with the handheld computing device 194 and determines the location or point 306 by examining the corresponding location estimate 366 of the handheld computing device 194, based on the exchanged RF signals.

The system 100 also comprises a back end server 140 coupled to the radio frequency-enabled asset tag location estimation system 130. The back end server 140 receives asset tag location information from the asset tag location estimation system 130 corresponding to the location estimates 361-366 of the RF-enabled asset tag 195 as the RF-enabled asset tag 195 moves within the space 101. The back end server 140 additionally determines, based on a predetermined correspondence criteria, a correspondence between the RF-enabled asset tag 195 location estimate 366 and location or point 306 of the electronic hardware device 112, 194 within the space. In response to determining the correspondence between the RF-enabled asset tag 195 and the electronic hardware device 112, 194 and based at least in part on the identifying information accepted via the electronic hardware device 112, 194, the back end server 140 further associates the received asset tag 195 location information corresponding to the location estimates 361-366 of the RF-enabled asset tag 195 as the RF-enabled asset tag 195 moved within the space 101 to identification of the selected user 193 in a database 147.

The identification of the selected user 193 may be performed by a remote back end server, potentially operated outside of the lighting system 100. In such an example, the back end server 140 sends the identifying information of the selected user 193 to the remote back end server, and receives a token that can be associated with the selected user 193. In these examples, the back end server 140 is not required to maintain full and complete records on the selected user 193, such as demographic and historical data, and only needs to maintain an association between the token of the selected user 193 and the location estimates 361-366 of the RF-enabled asset tag 195 as the RF-enabled asset tag 195 moved within the space 101 to identification of the selected user 193. The back end server 140 can also receive a one-time token for the selected user 193, thereby limiting the ability to track the selected user over multiple visits by solely viewing the data within the back end server 140: the remote server in this example would be required to associate multiple one-time tokens with a single selected user 193.

When the back end server 140 determines the correspondence between the RF-enabled asset tag 195 location estimates 361-366 and location 306 of the electronic hardware device 112, 194 within the space 101, the back end server 140 indicates that the RF-enabled asset tag 195 and the electronic hardware device 112, 194 are located within a critical distance of one another, at least approximately when the electronic hardware device 112, 194 accepts the identifying information from or about the selected user 193. The back end server 140 additionally associates the asset 196 to the selected user 193 in the database 147. The back end server 140 further generates a graph 311-317 of the asset tag 195 position within the space 101 over time, based on the location estimates 301-306 of the asset tag 195 received from the asset tag location estimation system 130.

In some examples, the selected user 193 may start using a first asset-tagged object, and the consolidated system 110 records a first set of location estimates 361-363 for that first asset-tagged object. However, the selected user may switch their asset-tagged object for another, and the consolidated system 110 then records a second set of location estimates 364-366, corresponding to the second asset-tagged object. If the consolidated system is able to correlated the first set of location estimates 361-363 and the second set of location estimates 364-366 to the same selected user 193, the back end server 140 further combines the asset tag 195 location estimates 361-366 from the asset tag location estimation system 130 corresponding to the locations estimates 361-366 of multiple RF-enabled asset tags 195 to create combined asset tag location information.

If the electronic hardware device 112, 194 is a mobile device 194, the back end server 140 associates the selected user 193 to the mobile device 194, and the back end server 140 associates the asset 196 to the selected user 193 in the database 147. If the electronic hardware device 112, 194 is a handheld computing device 194, the space 101 further comprises a threshold 330, defined as a two-dimensional plane extending vertically between four points within the space 101. In this alternative example, the back end server 140 performs the determination of a correspondence between the RF-enabled asset tag 195 location estimate 366 and the position estimate 376 of the electronic hardware device 194 when the RF-enabled asset tag 195 passes through the threshold 330. The back end server 140 additionally confirms based on the predetermined correspondence criteria, the correspondence between the RF-enabled asset tag 195 location estimate 366 and the position estimate 376 of the electronic hardware device 112, 194 within the space 101. Confirmation of the correspondence indicates that the RF-enabled asset tag 195 and the electronic hardware device 112, 194 remain located within a critical distance of one another.

Further, the back end server 140 determines, based on the predetermined correspondence criteria, a lack of correspondence between the RF-enabled asset tag 195 location estimate 363 and the position estimate 386 of the electronic hardware device 194 within the space 101. This might occur if the selected user 193 parts from the tagged asset 196, or leaves the store and returns later: the position estimates 381-386 in this example lack correspondence to the location estimates 361-366 because the location time 341-346 of the position estimates 381-386 do not align with the location times 331-336 of the location estimates 361-366, even if the points 301-306 are the same. In other examples, the position estimates 381-386 may not match the location estimates 361-366 due to having different points 301-306 recorded, or because of a combination of mismatches in both asset tag location time 331-336 to electronic hardware device 194 location time 341-346, and mismatches in asset tag points 301-303 and electronic hardware device 194 points 304-306. Determination of the lack of correspondence indicates that the RF-enabled asset tag 195 and the electronic hardware device 194 are located beyond a critical distance of one another.

In response to the back end server 140 determining the lack of correspondence between the RF-enabled asset tag 195 location estimate 363 and the position estimate 386 of the electronic hardware 194 device within the space 101, the back end server 140 disassociates the received asset tag 195 location information including the location estimates 361-366 of the RF-enabled asset tag 195 as the RF-enabled asset tag 195 moved within the space 101 to identification of the selected user 193 in the database 147.

When the asset tag location estimation system 130 estimates the location of the RF-enabled asset tag 195 by having the RF-enabled asset tag 195 record which radio frequency-enabled nodes 111 the RF-enabled asset tag 195 is able to communicate with, the RF-enabled asset tag 195 sends the records of which radio frequency-enabled nodes 111 the RF-enabled asset tag 195 is able to communicate, including the Node ID 459, with to the back end server 140 via the electronic hardware device 112, 194. In this alternative example, the electronic hardware device is an installed stationary computing device 112, or a handheld computing device 194.

Figure 4:
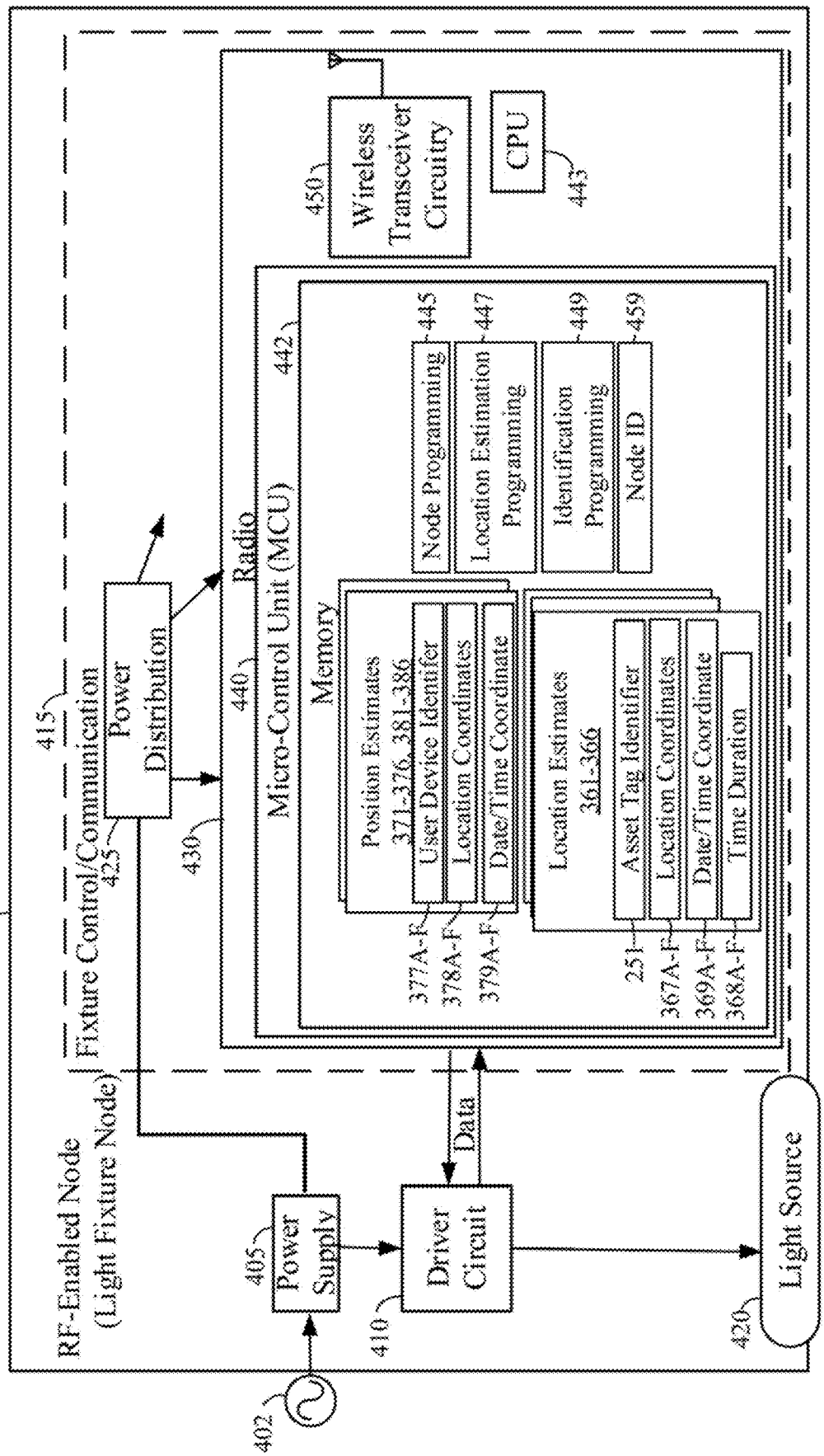
FIG. 4 is a high level functional block diagram of a light fixture example of a wireless enabled node.

As shown in FIG. 4, the radio 430 of the light fixture node type radio frequency-enabled node 111 includes a microcontrol unit (MCU) 440, and wireless transceiver circuitry 450. As shown, MCU 430 is coupled to driver circuit 410 and controls the lighting operations of the light source 420 via the driver circuit 410. Light source 420 includes electrical-to-optical transducers include various light emitters, although the emitted light may be in the visible spectrum or in other wavelength ranges. Suitable light generation sources include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

A lamp or "light bulb" is an example of a single light source. An LED light engine may use a single output for a single source but typically combines light from multiple LED type emitters within the single light engine. Light source 420 can include light emitting diodes (LEDs) that emit red, green, and blue (RGB) light or tunable white light. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output.

In the examples herein, the light fixture node type RF enabled nodes 111 include at least one or more components forming a light source 420 for generating the artificial illumination light for a general lighting application as well as wireless transceiver circuitry 450. In several examples, such RF-enabled nodes 111 may take the form of a light fixture, such as a pendant or drop light or a downlight, or wall wash light or the like. For example, RF-enabled nodes include a pendant down light suspended/hanging from the ceiling, a 2×4 feet light fixture flush mounted on the ceiling, or sconces hung on the wall. Other fixture mounting arrangements are possible. For example, at least some implementations of the luminaire may be surface mounted on or recess mounted in a wall, ceiling or floor. Orientation of the RF-enabled nodes 111 and components thereof are shown in the drawings and described below by way of non-limiting examples only. The RF-enabled nodes 111 may take other forms, such as lamps (e.g. table or floor lamps or street lamps) or the like. Additional devices, such as fixed or controllable optical elements, may be included in the luminaire, e.g. to selectively distribute light from the illumination light source.

Each respective one of the RF-enabled nodes 111 further includes wireless transceiver circuitry 450 configured for wireless communication over a nodal wireless communication network 170. In the example, the nodal wireless communication network 170 can be a wireless mesh network (e.g., ZigBee, DECT, NFC, etc.), a personal area network (e.g., Bluetooth™ or Z-Wave), a visual light communication (VLC) network, or Wi-Fi. A VLC network is a data communications variant which uses visible light between 400 and 800 THz (780-375 nm), and is a subset of optical wireless communications technologies.

It should also be understood that the communication protocols over the local wireless communication network 106 may be varied, and thus may be via nLight® (commercially available from Acuity Brands Lighting), digital multiplex (DMX) control, Fresco® control network (FCN) (commercially available from Acuity Brands Lighting). FCN, DMX control, nLight®, and Z-Wave are lighting-centric networks that control a variety of luminaires 10A-T. In some examples, the RF asset tag location estimation system 130 can further include an optional secondary network (e.g., wired or wireless), such as a LAN or WAN network for communication between the various RF-enabled nodes 111 and the back end server 140.

Although other radio technologies may be used, the example utilizes Bluetooth™ radios. Although other types of networking or protocols may be utilized, the example nodal wireless network 170 implements a "flooding" type wireless protocol. Other example network protocols include "star", "bus", "ring", and "mesh" type wireless protocols.

Although the nodal wireless network 170 may use other networking technologies or protocols, the example nodal wireless communication network 170 is a flooding (e.g. non-routed) type nodal wireless network. In such an example, the nodal wireless network 170 implements a flooding type protocol so as to distribute a transmitted packet from any source on the network throughout the nodal wireless network 170.

The MCU 440 includes a memory 442 (e.g. volatile RAM and non-volatile flash memory or the like) and a node processor in the form of a central processing unit (CPU) 443.

Figure 5:
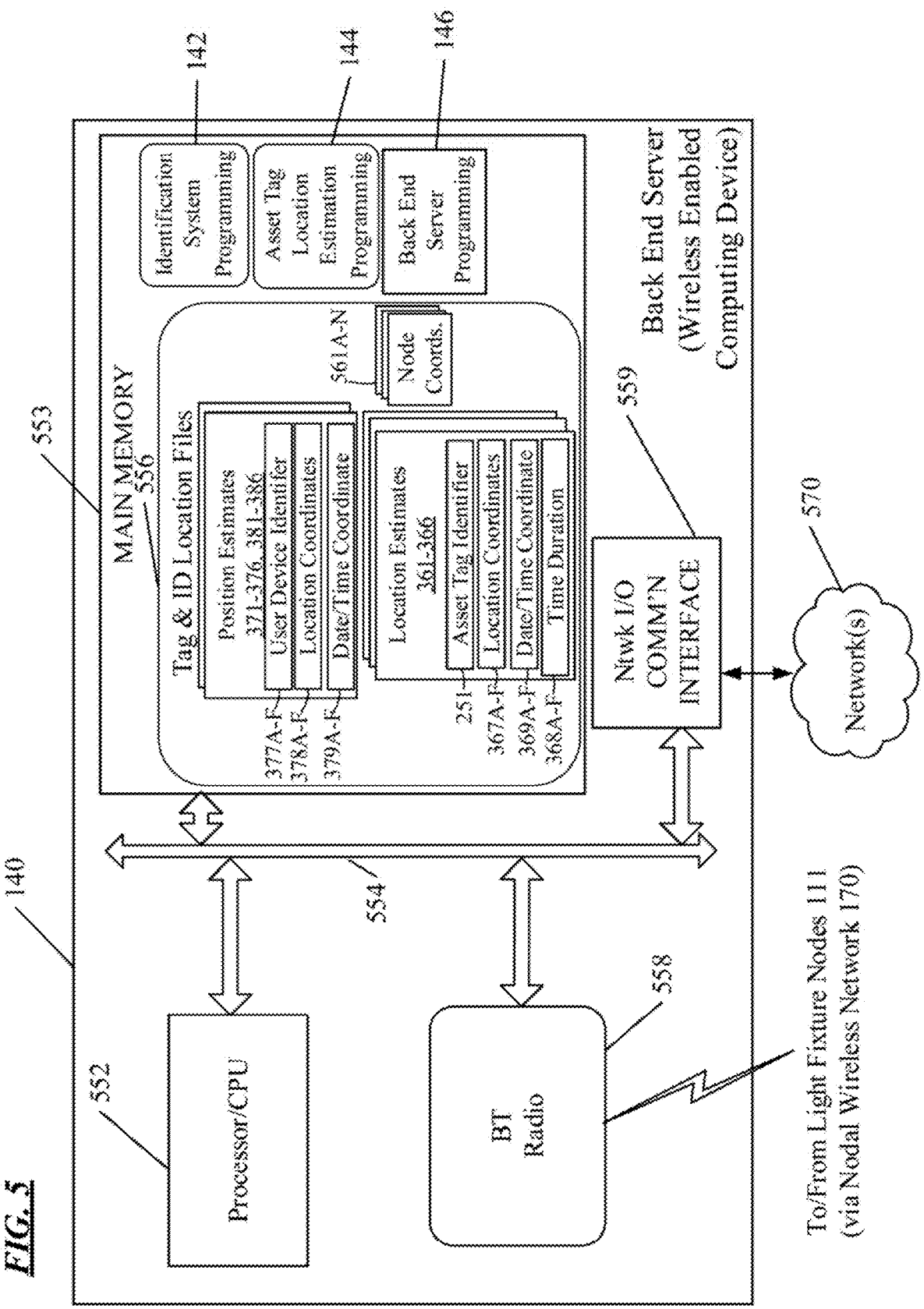
FIG. 5 is a high level functional block diagram of the back end server that collects and associates asset tag locations and user identifications.

CPU 443, including like that shown for the logic circuit 250 in FIG. 2, and processor 552 in FIG. 5 serve to perform various operations, for example, in accordance with instructions or programming executable by processors 443, 250, 552. For example, such operations may include operations related to communications with various consolidated system 110 elements, such as RF-enabled nodes 111. Although a processor 443, 250, 552 may be configured by use of hardwired logic, typical processors are general processing circuits configured by execution of programming. Processors 443, 250, 552 include elements structured and arranged to perform one or more processing functions, typically various data processing functions. Although discrete logic components could be used, the examples utilize components forming a programmable CPU. A processor 443, 250, 552 for example includes one or more integrated circuit (IC) chips incorporating the electronic elements to perform the functions of the CPU. The processors 443, 250, 552 for example, may be based on any known or available microprocessor architecture, such as a Reduced Instruction Set Computing (RISC) using an ARM architecture, as commonly used today in mobile devices and other portable electronic devices. Alternatively, the processors 443, 250, 552 for example, may be based on any known or available processor architecture, such as a Complex Instruction Set Computing (CISC) using an Intel architecture, as commonly used today in servers or personal computing devices. Of course, other processor circuitry may be used to form the CPU or processor hardware in other examples of RF positioning nodes 108.

It should be noted that a digital signal processor (DSP) or field-programmable gate array (FPGA) could be suitable replacements for the processor 443, 250, 552. Program aspects of the technology may be thought of as "products" or "articles of manufacture" typically in the form of executable code or process instructions and/or associated data that is stored on or embodied in a type of machine or processor readable medium (e.g., transitory or non-transitory), such as memory 442, memory 250 of FIG. 2, main memory 553 of FIG. 5, or a memory of a computer used to download or otherwise install such programming into the RF-enabled nodes 111, or a transportable storage device or a communications medium for carrying program for installation in elements of the consolidated system 110.

The memory 442 stores node programming 445 for implanting the operations of the radio frequency-enabled node 111, for lighting control operations, commissioning, maintenance, and diagnostic operations and for controlling communications and/or data processing related to functions of the lighting system 100. The memory 442 further stores location estimation programming 447 for communicating with the asset tags 204 interfacing with the RF asset tag location estimation system 130, and additionally stores identification programming 449 for interfacing with the user identification interface 125 or the user ID device 194 smartphone used by the identification system 120 for identifying the user.

The memory 442 also includes location estimates 361-366 that have not yet been sent to the back end server 140. These location estimates 361-366 each include the date/time coordinate 369A-F, which is the date and time a respective location coordinate 367A-F is captured. Location coordinates 367A-F are an approximation of the two-dimensional position of the asset tag 195. Location estimates 361-366 further include and the asset tag identifier 251 of the asset tag 195 for which the location estimate 361-366 is captured. Additionally, the memory 442 includes a node identifier (ID) 459 of the radio frequency-enabled node 111 itself to identify the radio frequency-enabled node 111 to external electronic components, and other information related to the radio frequency-enabled node 111. For example, as shown in FIG. 5, the back end server 140 can map the unique node ID 459 to respective node coordinates 561A-N of the node 111. Additionally, the memory 442 includes position estimates 371-376, 381-386, which may not have yet been sent to the back end server 140. These position estimates 371-376, 81-386 are structurally similar to location estimates 361-366, with respective location coordinates 378A-F and date/time coordinates 379A-F, but track d user device 194 and not asset tag 195. As shown, position estimates 371-376 381-386 include a respective user device identifier (ID) 377A-F, which identifies the user ID device 194 for which the position estimate 452 is captured, rather than an asset tag ID 251.

The radio frequency-enabled node 111 is able to implement the hardware and software of the location estimation system 130, and the identification system 120 in examples where users 193 are identified via their device 194. The radio frequency-enabled node 111 can communicate via the nodal wireless network 170 with the back end server 140 running the back end server programming 146 including the identification system programming 142 and the asset tag location estimation programming 144.

Though this radio frequency-enabled node 111 is depicted as a light fixture node, the radio frequency-enabled node 111 is not limited to being a light fixture: any RF node that connects to a nodal wireless network 170 and has the hardware to the role of a member node of the identification system 120 or asset location estimation system 130 is a valid radio frequency-enabled node 111.

FIG. 5 is a functional block diagram of a general-purpose computer system, by way of just one example of a hardware platform that may be configured to implement the back end server (wireless enabled computing device) 140. The example wireless enabled computing device 140 will generally be described as an implementation of a server platform or host type computer, e.g. as might be configured as a blade device in a server farm or in network room of a particular premises. Alternatively, the computer system may comprise a mainframe or other type of back end server system capable of web-based communications, media content distribution, or the like via the network 570 and the on-premises nodal wireless network 170.

The back end server 140 in the example includes a central processing unit (CPU) 552 formed of one or more processors, a main memory 553, and an interconnect bus 554. The circuitry forming the CPU 552 may include a single microprocessor, the circuitry forming the CPU 552 may include a number of microprocessors for configuring the computer system 140 as a multi-processor system, or the circuitry forming the CPU 552 may use a higher speed processing architecture. The main memory 553 in the example includes ROM, RAM and cache memory; although other memory devices may be added or substituted, including magnetic type devices (tape or disk) and optical disk devices that may be used to provide higher volume storage.

The back end server 140 runs a variety of applications programs and stores and processes various information in a database or the like for control of the light fixtures coupled to the Bluetooth Radio 558, wall controllers (not shown) and any other elements of the consolidated system 110 and possibly elements of an overall building managements system (BMS) at the premises. The programming and stored information includes the identification system programming 142 and the tag controller programming 144.

In operation, the main memory 553 stores instructions and data for execution by the CPU 552, although instructions and data are moved between memory 553 and the CPU 552 via the interconnect bus 554. For example, the main memory 553 is shown storing tag and identifier (ID) location files 556, such as locations and paths of asset tags either associated or not associated with a selected user 193. Although tag and ID location files 556 are utilized, a database or a variety of other storage techniques can be used. A portion or all of such a tag and ID location file 556 may be transferred from main memory 553 and processed by the CPU 552 to divide the tag location data into portions for transport as contents of a sequence of packets to be sent over the nodal wireless network 170. The back end server 140 holds the tag and ID location files 556 generated by the identification system 120 and the RF asset tag location estimation system 130. These tag and ID location files 556 include the location estimates 361-366 and position estimates 371-376, 381-386 sent by radio frequency-enabled nodes 111. The location estimates 361-366 and position estimates 371-376, 381-386 in the back end server 140 include the same elements shown in the radio frequency-enabled nodes 111 as described in FIGS. 3-4. The tag location files 556 additionally store the node coordinates 561A-N, which include the coordinates of each unique radio frequency-enabled node 111A-N in the system 100, so that the back end server 140 is able to perform proper mapping and locating when processing location estimates 451.

The main memory 553 stores the software programming 510 as needed for execution by the processor(s) forming the CPU 552. When so executed, the programming 510 and thus the CPU 552 configure the wireless enabled computing device 140 to perform the functions of the back end server programming 146, for relevant aspects of the asset tag location estimation, user identification, and user tag association described herein.

The CPU 552 and memory 553 may handle programs and files in a similar fashion for other functions of the consolidated system 110, such as control of the light fixtures at radio frequency-enabled nodes 111, operation of any wall controllers (not shown) and any other elements of the lighting system and possibly control of elements of an overall building managements system (BMS) at the premises.

The computer system of the back end server 140 also includes one or more input/output interfaces for communications, shown by way of example as a wireless transceiver 658 as well as one or more network interfaces 659 for data communications via the nodal wireless network 170. Although other wireless transceiver arrangements may be used, the example back end server 140 utilizes a Bluetooth radio compatible with the particular iteration of Bluetooth protocol utilized on the nodal wireless network 170. The Bluetooth transceiver 558, for example, may be a Bluetooth radio of light fixture node 111 or a further type radio specifically adapted for integration and operation in a computing device like that used for the back end server 140 that also is compatible with the applicable Bluetooth protocol. Each interface 559 may be a high-speed modem, an Ethernet (optical, cable or wireless) card or any other appropriate data communications device. The physical communication link (s) to/from the interface 559 may be optical, wired, or wireless (e.g., via satellite or cellular network).

Although not shown, the computer platform configured as the back end server 140 may further include appropriate input/output ports for interconnection with a local display and a keyboard and mouse or with a touchscreen or the like, serving as a local user interface for configuration, programming or trouble-shooting purposes. Alternatively, system operations personnel may interact with the computer system of the back end server 140 for control and programming of the consolidated system 110 from a remote terminal device via the Internet or some other link via any network 570.

The example FIG. 5 show a single instance of a back end server wireless enabled computing device 140. Of course, the functions of the back end server 140 may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like that of the back end server wireless enabled computing device 140 generally are conventional in nature, and it is presumed that those skilled in the art are sufficiently familiar therewith to understand implementation of the present system and associated lighting control technique using suitable configuration and/or programming of such computer platform(s) based on the description above and the accompanying drawings.

Figure 6:
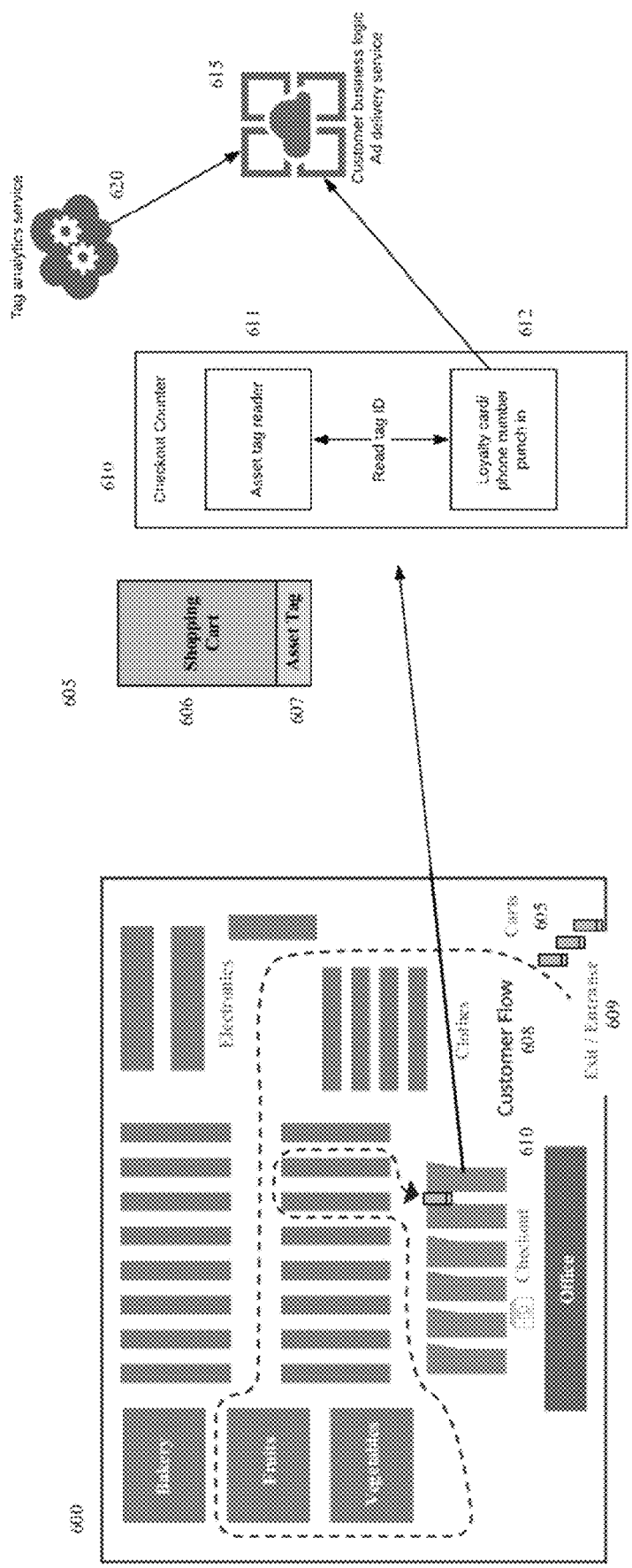
FIG. 6 is a depiction of an indoor space with additional detail of a shopping cart asset with asset tag, a checkout counter terminal, and back end processing services.

FIG. 6 is an overhead diagram of the path of a tagged asset 605 through a space 600. The space 600 in this example is depicted as a supermarket, however any kind of space 600 that can be traversed by the asset 605 could be a valid example. The tagged asset 606 has an asset tag 607, and is a shopping cart 606 in this example. At the beginning of the path, the shopping cart 606 is stored and is not in use. A user 193 enters the space through the door, and takes control of the tagged shopping cart 605. The user then proceed to walk along the dotted customer flow path 608, potentially examining the goods on sale in the supermarket 600. During this, the asset tag location estimation system 130 is tracking the position of the asset tag 607, and recording the tag's 607 position over time within the space 600. The user 193 moves with the shopping cart 606, and consequently the asset tag 607. The user 193 may spend more time at some points along the customer flow path 608 than others, which is recorded: this information can be valuable to determine user's 193 focus within the store, and can lead to improvements in where products are located, and in what products are stocked. Finally, the user 193 proceeds with their cart and asset tag 195 down path 316 to location estimate 306, which is the checkout counter 610. This checkout counter 320 acts as a user identification interface 125.

Up to this point, the consolidated system 110 has only collected path information: the consolidated system 110 has to associate that information with a specific user 193 or their account. However, when the user 193 performs the checkout process, they are asked to identify themselves: for example, by presenting a membership card or ID at the loyalty card/phone number punch in 612. At or near the time the user 193 identifies themselves, the consolidated system 110 locates the asset tag 607 in closest reasonable proximity to the checkout counter 610. It does this via an asset tag reader 611, which may be a conventional radio frequency-enabled node 111, or may be a radio frequency-enabled node 111 modified to have a higher level of precision in identifying which asset tags 607 are likely being used at the checkout counter 610. Because the user 193 is near the checkout counter 610, and the checkout counter is near the asset tag 607, it is likely that the user 193 has been travelling with the asset tag 607 and consequently the shopping card 606 during their trip through the shopping space 600. Therefore, with this association, the consolidated system 110 can now associate the user 193 with the customer flow path 608 made through the store 600 by the asset tag 607. On repeat trips, or on trips to other spaces with similar systems, the owner of the space can compare multiple store visits by the same user 193 and determine if, for example, changing the ordering of their shelves improves shopping speed. When the customer flow path 608 is combined with the sale data, stores can additionally see whether placing certain goods in certain places increases or decreases sales of particular goods.

Once the user 193 has been identified and associated with the customer flow path 608 taken by the shopping cart 606, the routing and purchasing information can be analyzed in a tag analytics service 620. This service 620 may be hosted on-site, or may be hosted off-site. The analytical data generated by the analytics service 620 allow for some of the improved customer business logic 615 discussed above: improving customer experience, and increasing sales. Additionally, this data can be leveraged to improve advertising and delivery 615, as the system owner can see, for example, what goods and displays the user 193 walked by, and did not take interest in.

Therefore, FIG. 6 depicts a method comprising communicating with a radio frequency (RF)-enabled asset tag 607 within a space 600. The method further comprises tracking the location of the RF-enabled asset tag 607 within the space 600. This tracking occurs as the as the asset tag 607 attached to the shopping card 606 travels along the customer flow 608. The location of the RF-enabled asset tag 607 is tracked by continuously contacting the RF-enabled asset tag with radio frequency-enabled nodes 111, or alternatively the location of the RF-enabled asset tag 607 is tracked by recording the identity of any radio frequency-enabled nodes 111 the RF-enabled asset tag is able to communicate with.

The method additionally comprises accepting information from or about a selected user 193. This acceptance occurs at the checkout counter 610. The method additionally comprises determining, based on a predetermined correspondence criteria, a correspondence between the RF-enabled asset tag 607 location and the location of an electronic hardware device, such as the checkout counter 610, within the space 600. Determining the correspondence between the RF-enabled asset tag 607 location and the electronic hardware device 610 location indicates that the RF-enabled asset tag 607 and the electronic hardware device 610 are located within a critical distance of one another at least approximately when the electronic hardware device 610 accepts the identifying information from or about the selected user 193. Determining the correspondence between the RF-enabled asset tag 607 location and the electronic hardware device 610 location is alternatively performed when the RF-enabled asset tag 607 passes through a threshold, such as an entrance or exit 609.

Still further, the method comprises associating the received asset tag 607 location information corresponding to the location of the RF-enabled asset tag 607 as the RF-enabled asset tag 607 moved within the space to the identifying information from or about the selected user 193, in response to determining the correspondence between the RF-enabled asset tag 607 and the electronic hardware device 610 and based at least in part on the identifying information accepted via the electronic hardware device 610.

Figure 7:
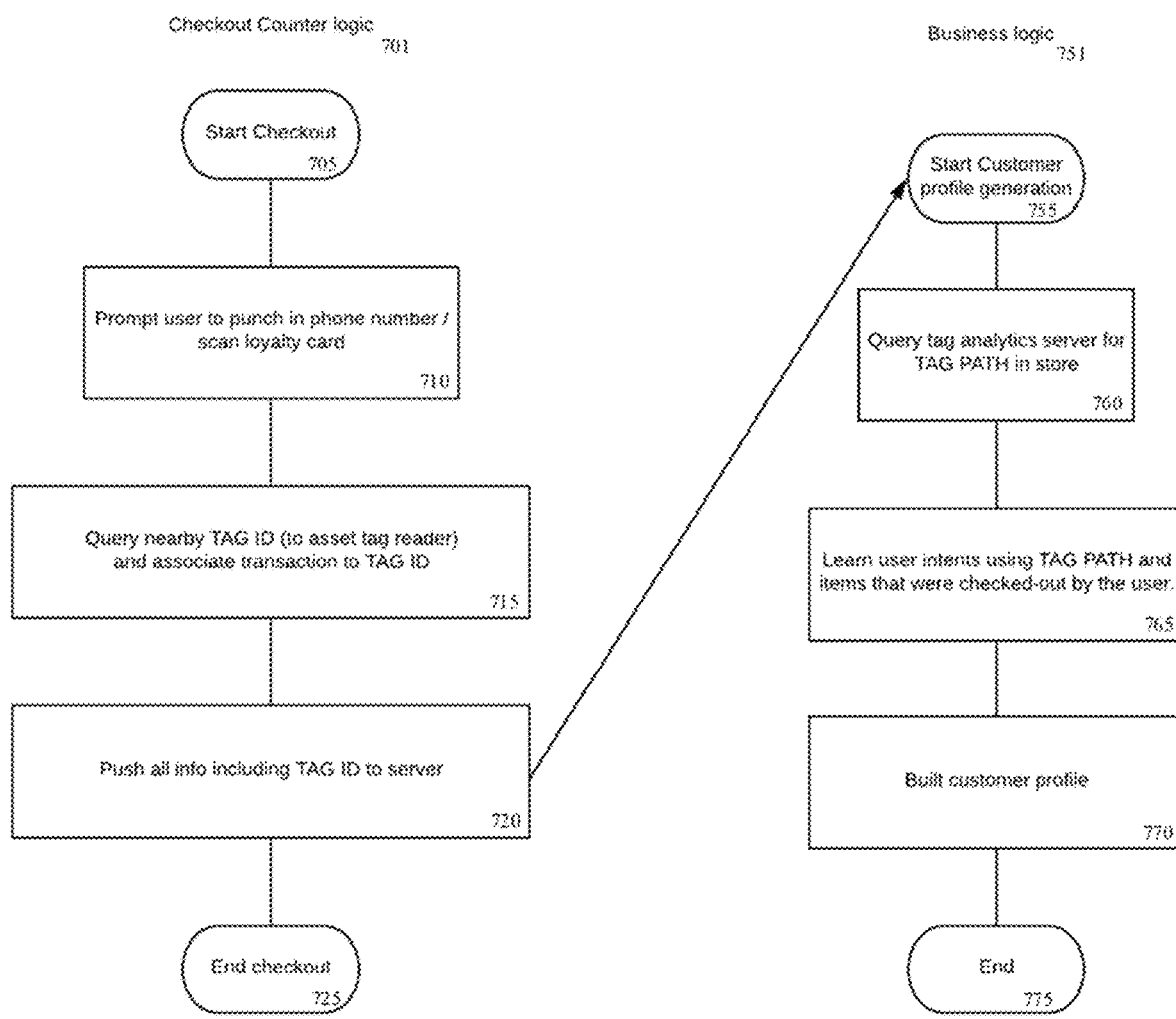
FIG. 7 is a flowchart illustrating an example of a method to associate a selected user to an asset tag via a checkout counter terminal.

FIG. 7 is a flowchart of the user identification logic when the identification is performed at a terminal, such as a point of sale terminal 125. There are two flows of logic, the checkout counter logic 701 and the business logic 751. Operation 705 under the checkout counter logic 701 is what starts the entire flow: the user 193 has travelled the store, ideally with an asset-tagged cart 196 or basket, and is starting their checkout process. The user 193 is prompted by the point of sale terminal 125 in operation 710 to enter their phone number or scan their loyalty card, which the user 193 does. After this, the consolidated system 110 queries the asset tag ID 251 near the asset tag reader, and associates the transaction to that asset tag 195 for operation 715. Then, it pushes all the information (the user phone number or loyalty card information, the transaction information, the asset tag ID 251) to the back end server 140 in operation 720. Then, from the perspective of the user 193, checkout ends in operation 725, and the user 193 leaves with their purchased goods.

However, after operation 720 the business logic flow 751 begins. Operation 755 starts creating a customer profile. This profile is populated with the path of the asset tag 195 associated with the pushed asset tag ID 251 from the operation 720, in operation 760. Next, operation 765 analyses the items in the associated transaction, and discerns user intent using the association between the path of the asset tag and the items that were actually purchased. This logic may also include factors such as where the items were placed in the store. With this information, the user's 193 intent, interests, pathing, and other on-site analytics are created and stored, and the customer profile is built in operation 770. Finally, with the profile complete, the process ends in operation 775.

FIG. 8 is a human-readable representation of an example of the data stored in the back end server 140, otherwise represented as the tag and ID location files 556. This is a page 623 of records taken over a period of time. First, each location estimate 361-366, 871-870 (sixteen are shown) has a record number that identifies the individual record. Next, the system that identified the object is labeled 682. Here, every location estimate 361-366, 861-870 is identified by RFID, but other examples might use systems such as GPS or cellular signal to track and triangulate asset tag positions. Third, the identity of the cart, or asset tag identifier 251A-D. Fourth, the date/time coordinate 369*x* at which the respective location coordinates 367*x* of the respective asset tag 251A-D is captured. Fifth, the respective location coordinates 367*x* of the respective asset tag 251A-D from at the date/time coordinate 369*x*, as X/Y coordinates. Finally, whether or not the record is associated with a selected user 193*x*.

Some particular examples of note are records 1 and 12: these records do not have a selected user 686. This indicates that the cart is not associated with a user, and that the cart is not moving, is in a storage location, or is otherwise not collecting meaningful data. Records 2, 6, 10, and 14 of cart "B" track a user "b" through the store: this is a user that has not been identified. Ideally, at some point in the future, this user will be identified either by using a point of sale terminal, or their smart device, and the selected user 686 can be updated for records 2, 6, 10, and 14 to the ID of the appropriate user. This can be compared to records 4 and 8 of cart "D": this cart has been associated with a user, possibly by the user's use of a point of sale terminal, and consequently the selected user 686 row has been updated with their selected user ID: "u10625". Following this, as previously noted, at record 12 the selected user is blank for cart "D", indicating it has been returned to the storage area, awaiting a new customer. By the time of record 16, a new customer is moving cart "D", and that anonymous user has been assigned the ID of "d", which will ideally be updated with the user's identity at some point in the future.

These records allow charting a path of a user through the store, and allows determining the speed at which they are travelling, and where they are lingering. In this example records are collected once per minute per cart, but records can be collected either more or less frequently. The collection rate can also be dynamic, based on the time of day, or based on the X/Y coordinates of the cart.

Figure 9:
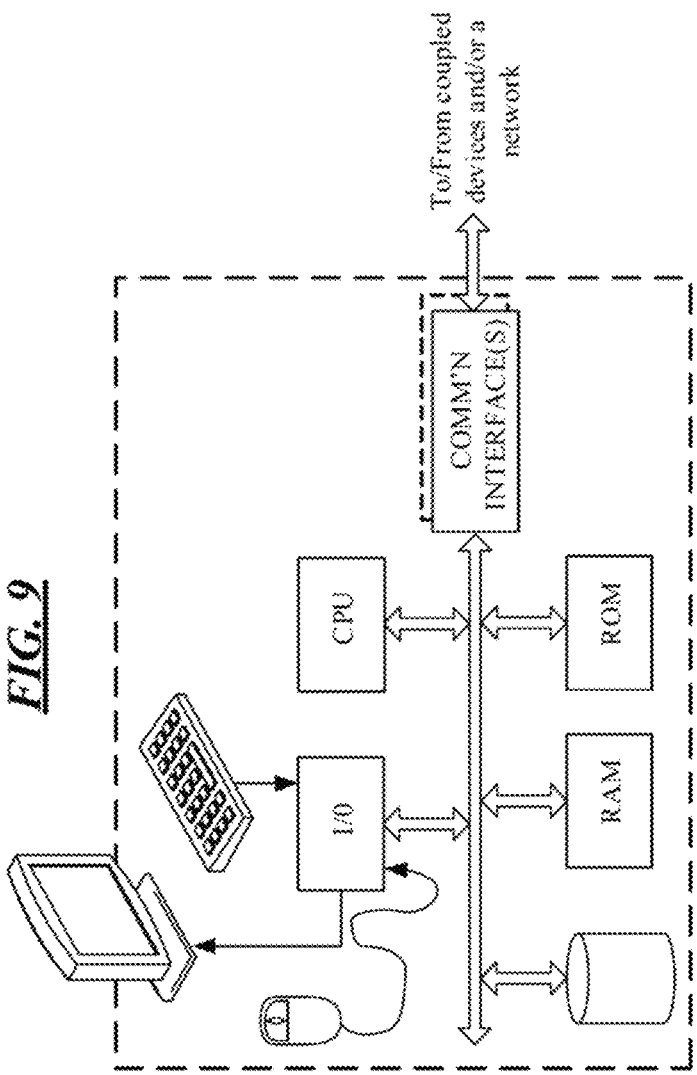
FIG. 9 is a simplified functional block diagram of a terminal device usable as an alternate example of equipment for identifying a user as a selected user in the identification system.

FIG. 9 depicts a computer with user interface elements, as may be used to implement a portable device or other type of work station or terminal device, although the computer of FIG. 9 may also act as a server if appropriately programmed. Hardware of a computer type user terminal device, such as a PC or tablet computer, may include a data communication interface, CPU, main memory and one or more mass storage devices for storing user data and the various executable programs (see FIG. 9). A mobile device (FIG. 10) type user terminal may include similar elements, but will typically use smaller components that also require less power, to facilitate implementation in a portable form factor. Mobile device 194 of FIG. 1 may be configured in a manner similar to that shown in FIG. 10. It is believed that those skilled in the art are familiar with the structure, programming and general operation of such computer equipment and as a result the drawings should be self-explanatory. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphone type mobile devices include similar but smaller input and output elements. Tablets and other types of smartphone type mobile devices utilize touch sensitive display screens, instead of separate keyboard and cursor control elements. In the example (FIG. 10), the mobile device may be configured to receive the asset tag location estimate for presentation of the estimated location to a user via a touch screen display of the mobile device. The hardware elements, operating systems and programming languages of such user terminal devices also are conventional in nature, and it is presumed that those skilled in the art are adequately familiar therewith.

Figure 10:
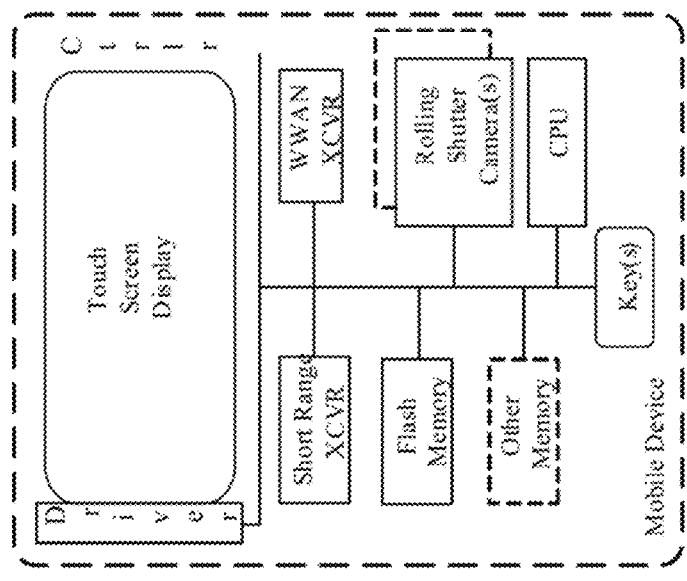
FIG. 10 is a simplified functional block diagram of a mobile device usable as yet another example of equipment for identifying a user as a selected user in the identification system.

Any of the steps or functionality of the detection and aggregation protocols in FIGS. 9-10 described herein can be embodied in programming or one or more applications as described previously. According to some examples, "function," "functions," "application," "applications," "instruction," "instructions," or "programming" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein.

Hence, aspects of the methods receiving signals, processing the received signals and generating and processing data for tracking location of an asset tag and location data of a user's mobile device in a space outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet, telecommunication networks, or various other data networks. Such communications, for example, may enable loading of the programming and the database from one computer or processor into another, for example, from a management server, back end server, or host computer of an enterprise location, or more generally, the location determination or estimation service provider into the computer platform and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

A server type network connected computer platform, for example (FIG. 5), includes a data communication interface for packet data communication. The server computer also includes a central processing unit (CPU), in the form of circuit(s) for one or more processors, for executing program instructions. The server platform typically includes an internal communication bus, program storage and data storage for various data files to be processed and/or communicated by the server, although the server computer platform often receives and/or distributes programming and data via network communications through one or more packet data networks such as the network 70 in FIG. 1. The hardware elements, operating systems and programming languages of such server type computers are conventional in nature, and it is presumed that those skilled in the art are adequately familiar therewith. Of course, the server functions may be implemented in a distributed fashion on a number of similar hardware platforms, particularly to host the cloud service for firmware updates, so as to distribute the processing load.

A computer type user terminal device, such as a PC or tablet computer, similarly includes a data communication interface, a CPU, main memory and one or more mass storage devices for storing user data and the various executable programs. A mobile device type user terminal (not separately shown) may include similar elements, but will typically use smaller components that also require less power, to facilitate implementation in a portable form factor. The various types of user terminal devices will also include various user input and output elements. A personal computer other work station, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

As shown by the above discussion, some functions relating to the user identification and asset tag location estimation association may be implemented on computers connected for data communication via the components of a nodal wireless network and/or a more general data network, operating as wireless enabled computing device, as a host or server platform for firmware update service or as a user terminal for interaction therewith as shown in FIG. 1. Although special purpose devices may be used for the wireless enabled computing device 140, such devices also may be implemented using one or more hardware platforms intended to represent a general class of data processing device commonly used to run gateway and/or "server" programming so as to implement the update controller or the cloud based firmware update service functions discussed above, albeit with an appropriate network connection for data communication with other equipment described above.

As known in the data processing and communications arts, a general-purpose computer typically comprises a central processor or other processing device, an internal communication bus, various types of memory or storage media (RAM, ROM, EEPROM, cache memory, flash memory, disk drives etc.) for code and data storage, and one or more network interface cards or ports for communication purposes. The software functionalities of such computers or the like involve programming, including executable code as well as associated stored data, e.g. files used for the updated firmware images, etc. Some of the software code, may be executed by the back end server of FIG. 5 or by a more general purpose type wireless enabled computing device. Additional software code may be executable by the general-purpose computer like that of FIG. 5 that functions as server hosting the user identification service 142 and asset tag location estimation association service 144. In operation, the code is stored within the particular platform. At other times, however, the software may be stored at other locations and/or transported for loading into the appropriate general-purpose computer system. Execution of such code by a processor of the computer or other type platform enables the platform to implement portions of the selective firmware update methodology, in essentially the manner performed in the implementations discussed and illustrated herein.

Aspects of the user identification and asset tag location estimation association service may be embodied in programming, for example, for the wireless enabled nodes, the wireless enabled computing device or for a computer server providing the cloud service. Programming for a wireless enabled node in the illustrated examples takes the form of firmware for the node processor typically the processor of the radio circuitry in the node. Programming for other programmable equipment may take the form of software. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the executable code and data of the programming. All or portions of the programming may at times be communicated through the Internet or various other telecommunication networks. For example, communications via one or more networks may enable transfer of tag location and user association data from one computer or processor into another. Thus, another type of media that may bear the programming elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the programming. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the command set customization and distribution of software, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, flash memory in a nodal device, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. For example, unless expressly stated otherwise, a parameter value or the like may vary by as much as ±10% from the stated amount.

Except as stated immediately above, nothing that has been stated or illustrated is intended or should be interpreted to cause a dedication of any component, step, feature, object, benefit, advantage, or equivalent to the public, regardless of whether it is or is not recited in the claims. It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

The invention claimed is:

1. A system, comprising:
   one or more radio frequency-enabled nodes located within a space, each radio frequency (RF)-enabled node being configured to communicate with an RF-enabled asset tag within the space, wherein the RF-enabled asset tag is coupled to an asset movable within the space;
   an RF-enabled asset tag location estimation system configured to track location of the asset within the space and determine location estimates of the RF-enabled asset tag responsive to communications directly between the one or more RF-enabled nodes and the RF-enabled asset tag;

an electronic hardware device configured to accept identifying information from or about a selected user; and
a back end server coupled to the RF-enabled asset tag location estimation system, the back end server configured to:
  receive asset tag location information from the asset tag location estimation system corresponding to the location estimates of the RF-enabled asset tag as the RF-enabled asset tag moves within the space;
  determine, based on a predetermined correspondence criteria, a correspondence between the asset tag location information and a position estimate of the electronic hardware device within the space; and
  in response to determining the correspondence between the asset tag location information and the position estimate of the electronic hardware device and based at least in part on the identifying information accepted via the electronic hardware device, associate the asset tag location information corresponding to the location estimates of the RF-enabled asset tag as the RF-enabled asset tag moved within the space to the identifying information from or about the selected user;
wherein:
  the asset tag location estimation system determines the location estimates of the RF-enabled asset tag by having the RF-enabled asset tag record which radio frequency-enabled nodes the RF-enabled asset tag is able to communicate with; and
  the RF-enabled asset tag sends records of which radio frequency-enabled nodes the RF-enabled asset tag is able to communicate with, to the back end server, via the electronic hardware device.

2. The system of claim 1, wherein:
determining the correspondence between the asset tag location information and the position estimate of the electronic hardware device within the space indicates that the RF-enabled asset tag and the electronic hardware device are located within a critical distance of one another at least approximately when the electronic hardware device accepts the identifying information from or about the selected user.

3. The system of claim 1, wherein the back end server is further configured to associate the asset to the selected user.

4. The system of claim 1, wherein the back end server is further configured to:
  generate a graph of an asset tag position within the space over time, based on the asset tag location information received from the asset tag location estimation system.

5. The system of claim 1, wherein:
the electronic hardware device is an installed stationary computing device, and the position estimate of the electronic hardware device in the space is determined at time of installation.

6. The system of claim 1, wherein:
the electronic hardware device is a handheld computing device; and
the radio frequency-enabled asset tag location estimation system is further configured to exchange RF signals with the handheld computing device and determine the position estimate of the handheld computing device based on the exchanged RF signals.

7. The system of claim 6, wherein:
the handheld computing device is a mobile device; and
the back end server is further configured to:
associate the selected user to the mobile device; and
associate the asset to the selected user.

8. The system of claim 1, wherein:
the space further comprises a threshold, defined as a two-dimensional plane extending vertically between four points within the space; and
the back end server is further configured to:
  determine the correspondence between the asset tag location information and the position estimate of the electronic hardware device, when the RF-enabled asset tag passes through the threshold.

9. The system of claim 1, wherein the back end server is further configured to:
  confirm, based on the predetermined correspondence criteria, the correspondence between the asset tag location information and the position estimate of the electronic hardware device within the space, wherein confirmation of the correspondence indicates that the RF-enabled asset tag and the electronic hardware device remain located within a critical distance of one another.

10. The system of claim 1, wherein the back end server is further configured to:
  determine, based on the predetermined correspondence criteria, a lack of correspondence between the asset tag location information and the position estimate of the electronic hardware device within the space, wherein determination of the lack of correspondence indicates that the RF-enabled asset tag and the electronic hardware device are located beyond a critical distance of one another; and
  in response to the determination of the lack of correspondence between the asset tag location information and the position estimate of the electronic hardware device within the space, disassociate the asset tag location information corresponding to the location estimates of the RF-enabled asset tag as the RF-enabled asset tag moved within the space to identifying information from or about the selected user in a database.

11. The system of claim 1, wherein the back end server is further configured to combine the asset tag location information from multiple RF-enabled asset tags to create combined asset tag location information.

12. The system of claim 1, wherein the asset tag location estimation system determines the location estimates of the RF-enabled asset tag using the radio frequency-enabled nodes to continuously contact the RF-enabled asset tag.

13. The system of claim 1, wherein:
the identifying information from or about the selected user is a loyalty account identifier.

14. The system of claim 13, wherein:
the loyalty account identifier is encoded within a loyalty card, and the electronic hardware device accepts the loyalty account identifier as the identifying information from or about the selected user.

15. A method, comprising:
communicating with a radio frequency (RF)-enabled asset tag within a space;
determining location estimates of the RF-enabled asset tag within the space responsive to communications between one or more RF-enabled nodes and the RF-enabled asset tag, wherein determining the location estimates of the RF-enabled asset tag includes having the RF-enabled asset tag record which radio frequency-enabled nodes the RF-enabled asset tag is able to communicate with;
accepting, via an electronic hardware device, identifying information from or about a selected user;
sending, from the RF-enabled asset tag, records of which radio frequency-enabled nodes the RF-enabled asset tag is able to communicate with, to a back end server, via the electronic hardware device, receiving, via the back end server, asset tag location information from an asset tag location estimation system corresponding to the location estimates of the RF-enabled asset tag as the RF-enabled asset tag moves within the space determining, based on a predetermined correspondence criteria, a correspondence between the asset tag location information and a position estimate of an electronic hardware device within the space; and in response to determining the correspondence between the asset tag location information and the position estimate of the electronic hardware device and based at least in part on the identifying information accepted via the electronic hardware device, associating the asset tag location information corresponding to the location estimates of the RF-enabled asset tag as the RF-enabled asset tag moved within the space to the identifying information from or about the selected user.

16. The method of claim 15, wherein:

determining the correspondence between the asset tag location information and the position estimate of the electronic hardware device indicates that the RF-enabled asset tag and the electronic hardware device are located within a critical distance of one another at least approximately when the electronic hardware device accepts the identifying information from or about the selected user.

17. The method of claim 15, wherein:

determining the correspondence between the asset tag location information and the position estimate of the electronic hardware device occurs when the RF-enabled asset tag passes through a threshold.

18. The method of claim 15, wherein:

determining the location estimates of the RF-enabled asset tag includes continuously contacting the RF-enabled asset tag with radio frequency-enabled nodes.

* * * * *